(12) United States Patent
Perez

(10) Patent No.: US 9,245,177 B2
(45) Date of Patent: Jan. 26, 2016

(54) LIMITING AVATAR GESTURE DISPLAY

(75) Inventor: Kathryn Stone Perez, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 443 days.

(21) Appl. No.: 12/792,609

(22) Filed: Jun. 2, 2010

(65) Prior Publication Data
US 2011/0298827 A1    Dec. 8, 2011

(51) Int. Cl.
*G06K 9/00*      (2006.01)

(52) U.S. Cl.
CPC .................. *G06K 9/00355* (2013.01)

(58) Field of Classification Search
CPC ........................................... G06T 7/20
See application file for complete search history.

(56) References Cited

U.S. PATENT DOCUMENTS

| | | | | |
|---|---|---|---|---|
| 5,969,755 A * | 10/1999 | Courtney | ............ | G06F 17/3079 348/135 |
| 6,178,205 B1 * | 1/2001 | Cheung | .................. | H04N 5/145 348/E5.066 |
| 6,675,384 B1 * | 1/2004 | Block et al. | ...................... | 725/28 |
| 7,039,676 B1 * | 5/2006 | Day | ...................... | H04M 3/567 345/473 |
| 7,908,554 B1 * | 3/2011 | Blattner | ................ | G06Q 10/107 715/706 |
| 8,014,567 B2 * | 9/2011 | Yoon | .................. | G06K 9/00355 345/156 |
| 8,396,004 B2 * | 3/2013 | Pratt | .............. | H04N 21/234336 348/14.01 |
| 2002/0147782 A1 * | 10/2002 | Dimitrova | .............. | H04N 7/163 709/207 |
| 2004/0127242 A1 * | 7/2004 | Dashevsky | ............... | H04W 4/00 455/502 |
| 2006/0025214 A1 * | 2/2006 | Smith | ...................... | A63F 13/12 463/30 |
| 2006/0177198 A1 * | 8/2006 | Jarman | ................. | H04N 9/8042 386/261 |
| 2007/0113181 A1 | 5/2007 | Blattner et al. | | |
| 2007/0260984 A1 * | 11/2007 | Marks et al. | ................... | 715/706 |
| 2008/0012866 A1 * | 1/2008 | Forbes | ..................... | G06T 13/00 345/473 |
| 2008/0215972 A1 * | 9/2008 | Zalewski | ............... | A63F 13/005 715/706 |
| 2008/0215974 A1 | 9/2008 | Harrison et al. | | |
| 2008/0225041 A1 * | 9/2008 | El Dokor et al. | .............. | 345/419 |
| 2009/0002479 A1 * | 1/2009 | Sangberg | ................ | H04N 7/147 348/14.02 |
| 2009/0040231 A1 | 2/2009 | Sano et al. | | |
| 2009/0044113 A1 * | 2/2009 | Jones | ....................... | G06T 13/40 715/707 |
| 2009/0079816 A1 * | 3/2009 | Qvarfordt et al. | .......... | 348/14.16 |
| 2009/0150778 A1 * | 6/2009 | Nicol, II | .................. | A63F 13/10 715/706 |
| 2009/0177979 A1 * | 7/2009 | Garbow | ................ | G06F 21/316 715/757 |

(Continued)

FOREIGN PATENT DOCUMENTS

| | | |
|---|---|---|
| CN | 1465188 | 12/2003 |
| EP | 1912175 A1 | 4/2008 |
| JP | 2009077380 A | 4/2009 |
| JP | 2009201765 A | 9/2009 |
| JP | 2010114626 A | 5/2010 |
| WO | 2009055342 A1 | 4/2009 |

OTHER PUBLICATIONS

Real-Time Hand Tracking and Gesture Recognition System, Nguyen et al., 2005.*

(Continued)

*Primary Examiner* — Ming Hon
*Assistant Examiner* — Phong Nguyen
(74) *Attorney, Agent, or Firm* — Micah Goldsmith; Judy Yee; Micky Minhas

(57) ABSTRACT

Technology determines whether a gesture of an avatar depicts one of a set of prohibited gestures. An example of a prohibited gesture is a lewd gesture. If the gesture is determined to be a prohibited gesture, the image data for display of the gesture is altered. Some examples of alteration are substitution of image data for the prohibited gesture, or performing a filtering technique to the image data depicting the gesture to visually obscure the prohibited gesture.

19 Claims, 16 Drawing Sheets

(56) References Cited

U.S. PATENT DOCUMENTS

| | | | |
|---|---|---|---|
| 2009/0195392 A1* | 8/2009 | Zalewski | G06F 3/012 340/573.1 |
| 2009/0202114 A1* | 8/2009 | Morin | A63F 13/12 382/118 |
| 2009/0217211 A1* | 8/2009 | Hildreth | G06F 3/017 715/863 |
| 2009/0221368 A1* | 9/2009 | Yen et al. | 463/32 |
| 2009/0254868 A1* | 10/2009 | Bokor et al. | 715/863 |
| 2009/0307595 A1* | 12/2009 | Clark | G06T 13/40 715/728 |
| 2010/0081508 A1* | 4/2010 | Bhogal et al. | 463/40 |
| 2010/0083112 A1* | 4/2010 | Dawson | G06F 3/04815 715/706 |
| 2010/0083140 A1* | 4/2010 | Dawson | A63F 13/12 715/757 |
| 2010/0203968 A1* | 8/2010 | Gill | H04L 67/38 463/32 |
| 2011/0078720 A1* | 3/2011 | Blanchard | H04N 7/165 725/25 |
| 2011/0283309 A1* | 11/2011 | Bliss et al. | 725/25 |
| 2012/0035929 A1* | 2/2012 | Gauld | G10L 19/0018 704/246 |

OTHER PUBLICATIONS

Toyama, Kentaro, et al., "Probabilistic Tracking in a Metric Space," Eighth International Conference on Computer Vision, Vancouver, Canada, vol. 2, Jul. 2001, 8 pages.

Amendment dated May 21, 2013, in Chinese Patent Application No. 201180027130.9 filed May 26, 2011.

Amendment dated May 21, 2014, in Chinese Patent Application No. 2013-513246 filed May 26, 2011.

Wei, "Avatar-mediated Face Tracking and Lip Reading for Human Computer Interaction", International Multimedia Conference, Oct. 10-16, 2004, pp. 500-503, ACM, New York, NY, USA.

Yang, "Avatar's Expression Control through Face Tracking", Soongsil University, retrieved Apr. 6, 2010, 6 pages, http://www.vrsj.org/ic-at/papers/2004/Workshop_1/W1-8.pdf.

Lee, "Interactive Control of Avatars Animated with Human Motion Data", ACM Transactions on Graphics, Jul. 2002, pp. 491-500, vol. 21, Issue 3, ACM, New York, NY, USA.

Broll, "Symbolic Avatar Acting in Shared Virtual Environments", Proceedings of the Workshop on Behavior for Life-Like Characters and Avatars, i3 Spring Days, Sitges, Spain, Mar. 9-10, 1999.

Office Action dated Dec. 2, 2014 in Chinese Patent Application No. 201180027130.9.

English language Abstract for Publication No. CN1465188 published Dec. 31, 2003.

Response to Office Action, with partial English translation, filed Apr. 16, 2015 in Chinese Patent Application No. 2011800271309.

"Second Office Action Received in Chinese Patent Application No. 201180027130.9", Mailed Date: Jul. 24, 2015, 12 pages.

"Office Action Received in Japan Patent Application No. 2013-513246", Mailed Date: Aug. 5 2015, 4 Pages.

Response to Office Action filed Oct. 8, 2015, and partial English translation, in Chinese Patent Application Number 201180027130.9.

* cited by examiner

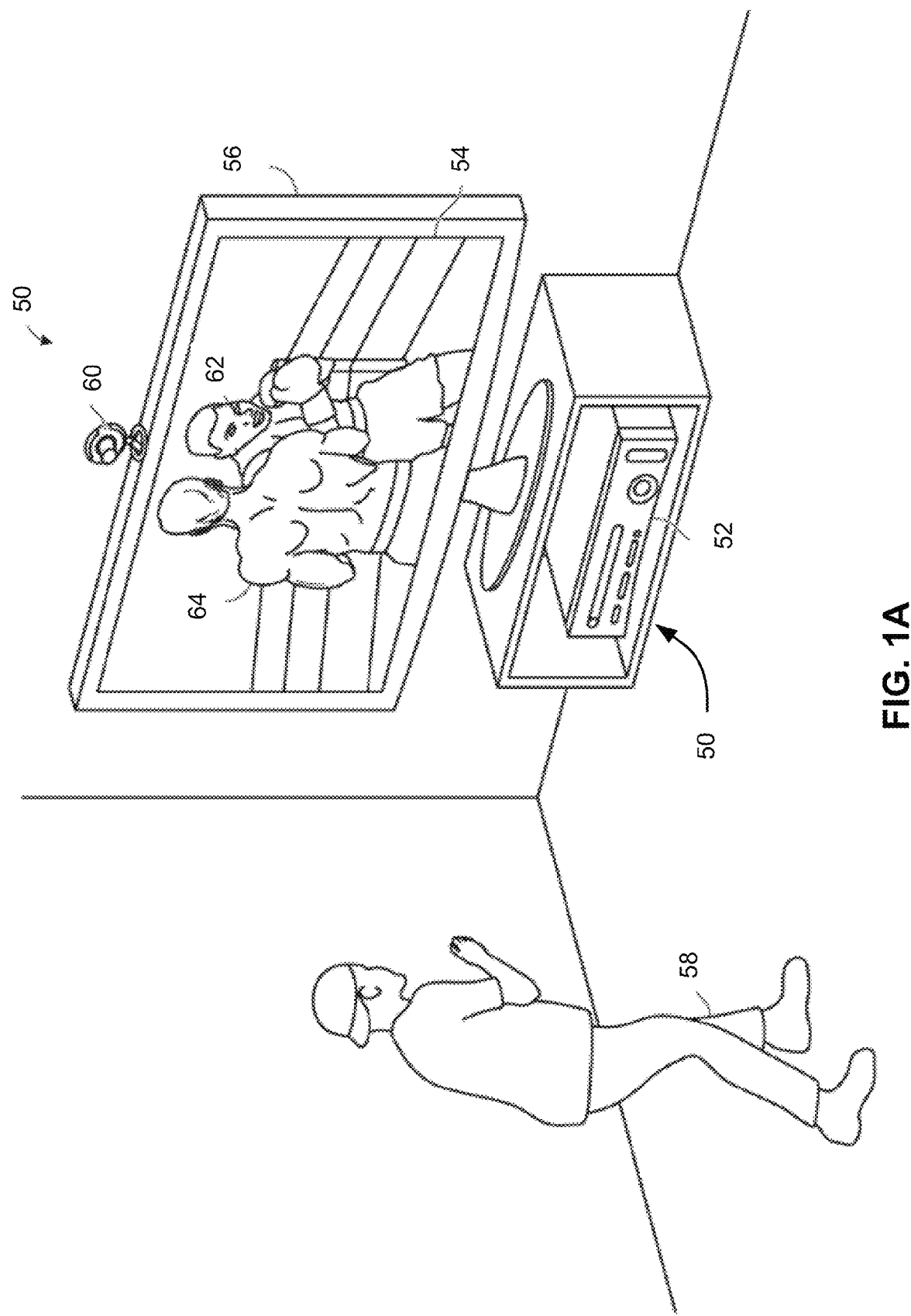

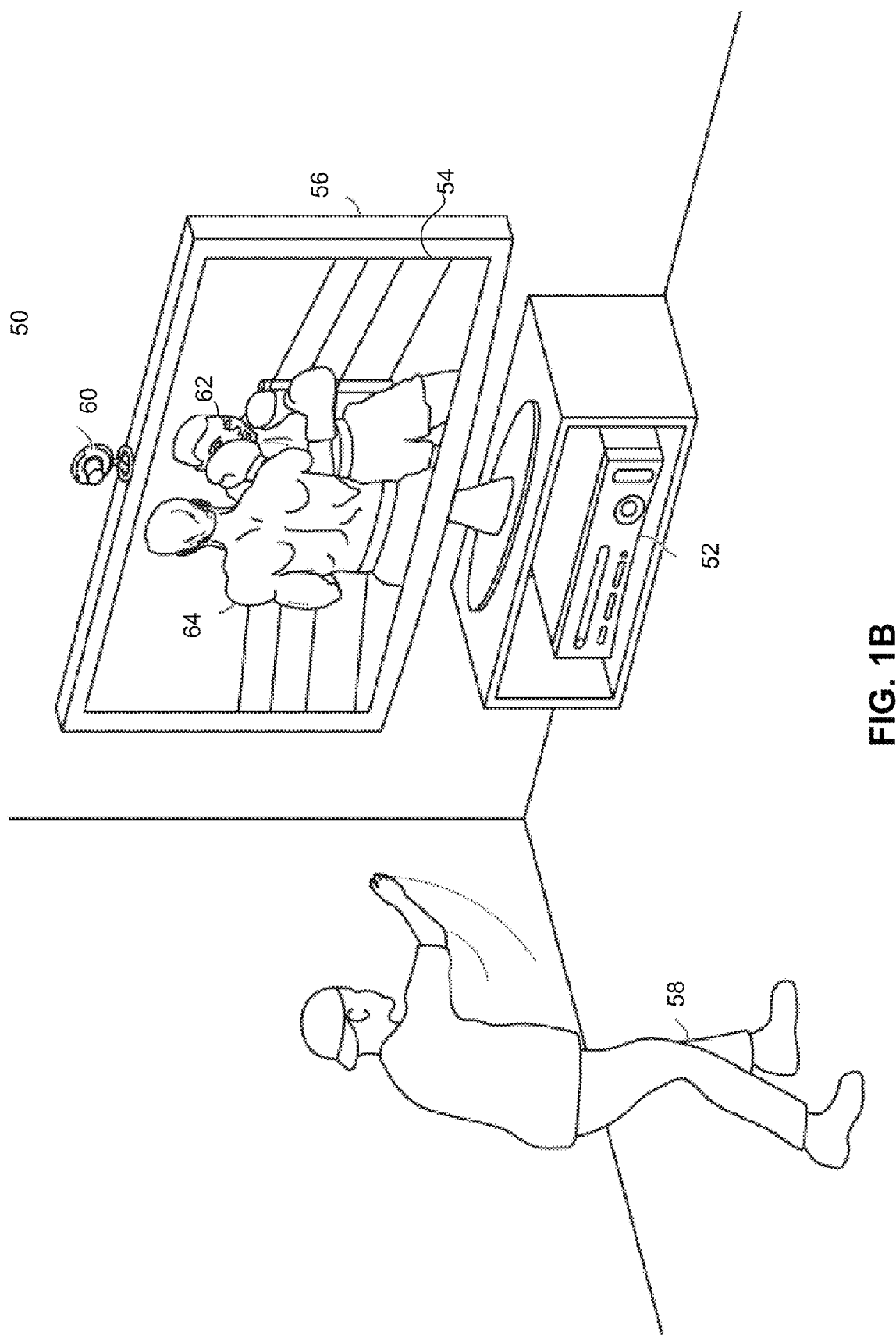

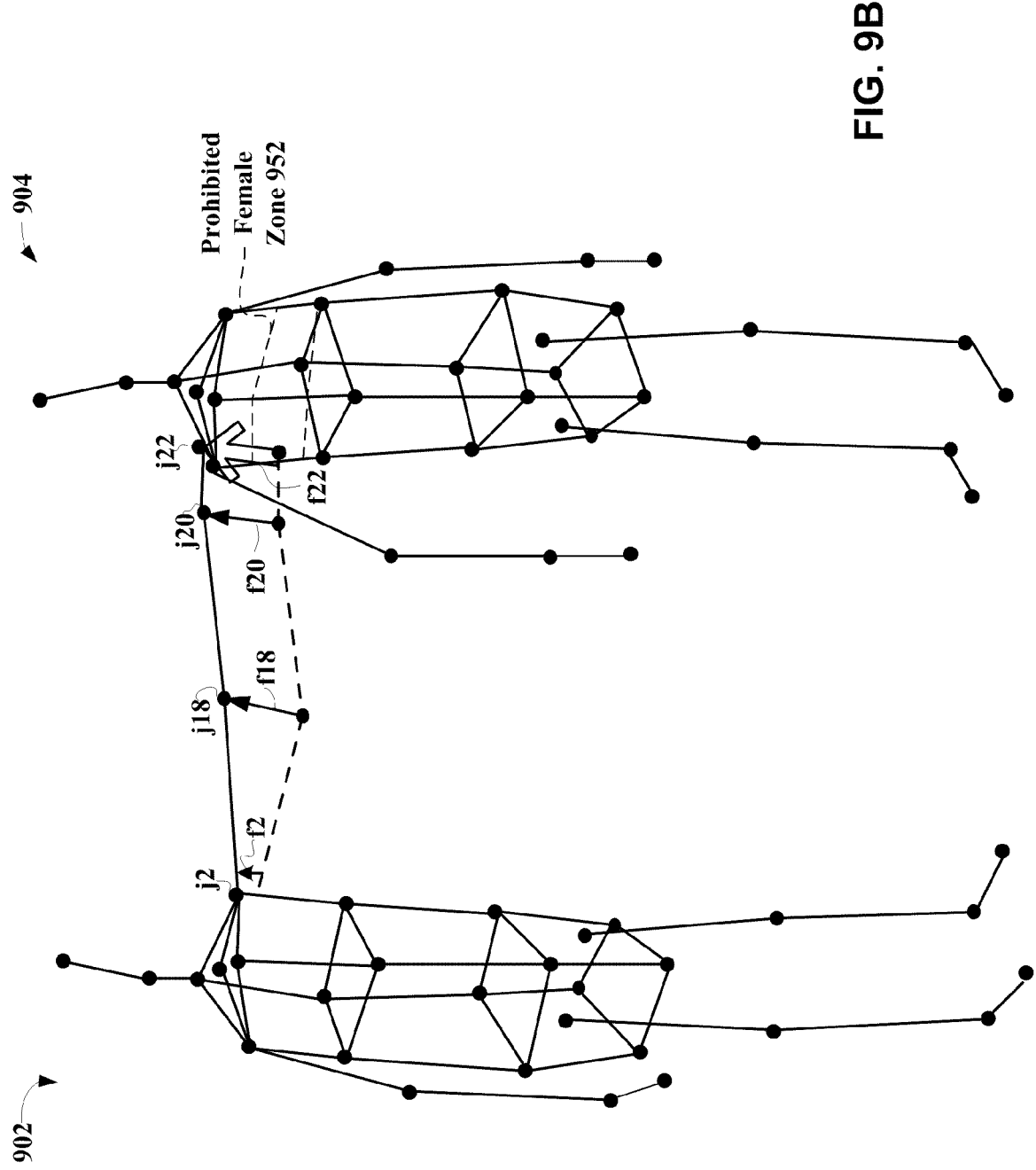

LIMITING AVATAR GESTURE DISPLAY

BACKGROUND

An avatar can be a computer-generated image which represents a user who is typically a human. The avatar can depict an image of the user that is highly representative of what the user actually looks like or it may be a character (e.g. human, fanciful, animal, animated object) with varying degrees of resemblance to the user or none at all. A user can control an avatar through certain actions, such as selecting buttons on a remote control device or moving a controller in a certain manner. Alternatively, a user may wear sensors on body parts to assist a tracking system track the user's actions to an avatar.

In another example, the user uses her body motions to control an onscreen avatar without special sensing devices attached to the user. A target recognition, analysis, and tracking system uses an image capture system to capture image data of a user in a physical space. Based on the captured image data, the system recognizes and tracks the user's natural movements in three dimensional space. Using the system, a user's actions can directly control actions of her associated avatar on a display. In other words, the avatar can mimic actions of the user in real-time.

A user may direct his or her avatar to perform an offensive action in a displayed scene. For example, an avatar may be directed to perform lewd or offensive actions or poses.

SUMMARY

Technology is presented for limiting gesture display of an avatar by determining, based on motion tracking data representing a gesture, whether the gesture depicts a prohibited gesture. If it is, image data representing the gesture for the avatar is altered. In one embodiment, motions of a user are tracked to motions of an avatar in real-time, and therefore, gesture determination and alteration occurs in real-time.

Alteration may include filtering the prohibited gesture, or substituting image data for the prohibited gesture in the display of the avatar. Additionally, criteria such as whether the avatar is displayed locally or is being transmitted for display to another computer can effect whether the gesture is displayed as is or its image data altered.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The features described in this summary and the following detailed description are not all-inclusive, and particularly, many additional features and advantages will be apparent to one of ordinary skill in the art in view of the drawings, specification, and claims hereof.

BRIEF DESCRIPTION OF THE DRAWINGS

The systems, methods, and computer readable storage media for limiting gesture display of an avatar in accordance with this specification are further described with reference to the accompanying drawings in which:

FIGS. 1A and 1B illustrate an example embodiment of a target recognition, analysis, and tracking system with a user playing a game in which technology embodiments for limiting display of a prohibited gesture by an avatar can operate.

FIG. 9B illustrates an example of substituting image data in the form of motion data for the prohibited interaction example of FIG. 9A as illustrated by skeletal model data for the two users.

DETAILED DESCRIPTION

Figure 2:
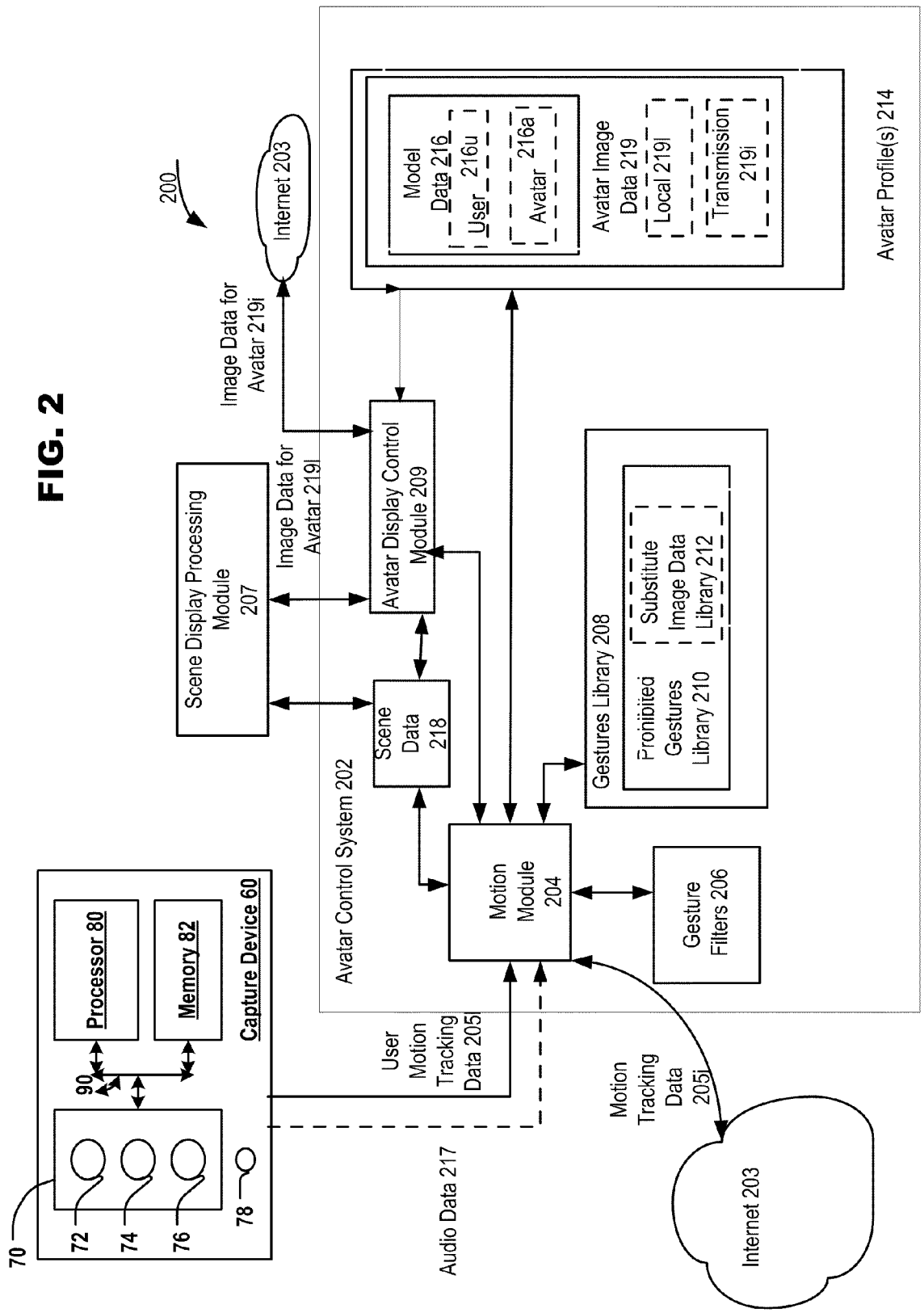
FIG. 2 is an illustrative embodiment of functional computer-implemented architecture for a system for limiting display of a prohibited gesture by an avatar.

FIGS. 1A and 1B illustrate a user interacting with an example embodiment of a target recognition, analysis, and tracking system 50 which recognizes human beings in their natural environment, without special sensing devices attached to the subjects, uniquely identifies them and tracks them in three dimensional space. Such an illustrative context presents an example context in which technology for limiting avatar display of a prohibited gesture is particularly useful. However, the technology can be applicable to other avatar control mechanisms such as a sensor based system in which a user wears sensors or avatar control systems based on devices, some examples of which are keyboards, a mouse, trackball, game pad, or joystick.

According to the example embodiment, the target may be a human target (e.g. user 58), a human target with an object, two or more human targets, or the like that may be scanned to generate a model such as a skeletal model, a mesh human model, or any other suitable representation thereof. The model may be tracked such that physical movements or motions of the target may act as a real-time user interface that adjusts and/or controls parameters of an application such as an electronic game. Furthermore, the model can be presented to applications as a model and delivered to them in real-time. For example, the tracked motions of a user may be used to move an on-screen character or avatar in an electronic role-playing game.

In one example in which the model is a multi-point skeletal model, target recognition, analysis, and tracking system 50 efficiently tracks humans and their natural movements by understanding the natural mechanics and capabilities of the human muscular-skeletal system. The example system 50 also uniquely recognizes individuals in order to allow multiple people to interact with the system via natural movements of their limbs and body.

Specifically, FIGS. 1A and 1B, illustrate an example embodiment of a configuration of a target recognition, analysis, and tracking system 50 with a user 58 playing a boxing game. As discussed below, software executing on a computer system 52 which controls or interacts with software on other computer systems of the communicatively coupled camera system 60 and audiovisual display unit 56 tracks the movements of user 58, analyzes them, and maps the movements to the user's avatar. Thus, in this example, the user 58 may move his body to control his avatar 64 on the display screen 54 in the boxing game against his opponent avatar 62.

A gesture comprises a motion or pose. The gesture can be performed by an avatar or by a user. Through moving his body, a user may create gestures. For example, a user may be captured in image data. An identified gesture of the user can be parsed for meaning as a control for an application or action to be performed. For example, the user 18 throws a jab in the boxing game of FIGS. 1A and 1B. The game application represents it in the boxing match, determines whether it makes contact on avatar 62 and increases the user's score if it does. A gesture can also be a motion or pose that is a meaningful expression. For example, it can express emotion or a thought or meaning. For example, a hand with only the middle finger extended can express anger or contempt. A gesture such as the Nazi salute can indicate an ethnically or culturally based derogatory meaning. A gesture may be a static pose, such as holding one's crossed forearms in front of his torso or it may be one or more movements. Furthermore, a gesture may comprise more than one body part, such as clapping the hands together.

For example, the target recognition, analysis, and tracking system 50 may be used to recognize and analyze the punch of the user 58 in a capture area (e.g. the portion of his living room in the field of view of image capture system 60) such that the punch may be interpreted as a gesture, in this case a game control of a punch for his player avatar 64 to perform in game space. Other gestures by the user 58 may also be interpreted as other controls or actions, such as controls to bob, weave, shuffle, block, jab, or throw a variety of different power punches. By tracking the punches and jabs of user 58, the boxing game software application determines his avatar's 64 score and which avatar (62 or 64) will win the match. Different applications will recognize and track different gestures. For example, a pitch by a user in a baseball game is tracked in order to determine whether it is a strike or a ball. Different motions or poses representing lewd or offensive gestures can also be recognized, and processing performed responsive thereto.

In other example embodiments, the human target such as the user 58 may have an object. A gesture may also incorporate props. In such embodiments, the user of an electronic game may be holding and using the object while participating in the game. The motions of the object are tracked and mapped onscreen so that the avatar is depicted with a virtual object representing the object that the user is manipulating. In an example embodiment, the virtual object tracks the motions of the physical object as it is being moved by the user. For example, the motion of a user holding a racket may be tracked and utilized for controlling an on-screen racket to hit a ball in an electronic sports game. In another example embodiment, the motion of a user holding an object may be tracked and utilized for controlling an on-screen weapon in an electronic combat game. Other objects may also be included, some examples of which are one or more gloves, balls, bats, clubs, guitars, microphones, sticks, pets, animals, drums, etc.

The boxing game context is illustrative of a real-time computing environment in which a user may behave inappropriately, and this behavior is reflected in the actions of his computer-generated avatar in real-time. Moreover, the actions of the avatar may be transmitting in an online environment to one or more users. The online transmission may be a broadcast transmission which is open to anyone who has access to the technology used to participate. This may include people of various ages and sensitivities.

FIG. 2 is an illustrative embodiment of a functional computer-implemented architecture for a system 200 for limiting display of a prohibited gesture by an avatar. Such an architecture system can be implemented as one or more processing modules which can operate by software executing on one or more processors and/or computer hardware or as hardware or firmware. The avatar control system 202 comprises a motion module 204 which is communicatively coupled to an avatar display control module 209, an audiovisual data capture system 60, and the Internet 203. The motion module 204 also has access to datastores stored in memory (e.g. 112, 314) such as an avatar profile 214.

In this embodiment the avatar profile 214 includes data and information for the real-time display of one or more avatars. Some examples of this data and information include model data 216 for each avatar which is used as a reference for motion tracking by the motion module 204. Model data 216 can be a subset of image data 219 for displaying the avatar. The image data 219 is sent to be displayed as part of a scene by the avatar display control module 207. Image data 219 for the avatar represents motions or poses for the avatar. In one example, the image data 219 representing motions or poses can be motion tracking data for the avatar. In one example, such motion tracking data can be stored in a motion capture file which the motion module 204 updates over time as new motion tracking data 205 is received. Other examples of image data 219 can be color image data for features of the avatar such as hair, facial features, skin color, clothing, the position of the avatar in the scene and any props associated with it. As discussed below, in one embodiment, an avatar performing a prohibited gesture 210 can be displayed on a local display performing the gesture, but have its image data which is transmitted to another computer or network altered to avoid depicting the prohibited gesture. In such a case, separate versions of image data are generated, one local 219*l* and one for transmission 219*i*, at least for portions including the prohibited gesture. Other information stored in the profile 214 can include typical modes of usage or play, age, height, weight information, names, high scores or any other information associated with a user and usage of the system.

The motion tracking data can be stored for a session. For example, a user in a game may save a game in progress, so he can return to it later.

The model data 216 includes a model for the avatar, which can be a skeletal model for example. In application contexts where an avatar control device such as a trackball, keyboard or joystick is used, there may not be separate model data for a user. The motion module 204 processes the input commands with respect to the direct model data 216a for the avatar, including the processing to verify that prohibited gestures are not being made. Additionally, model data received over a network may be with respect to the avatar's model 216a. The motion module 204 as discussed below can process the avatar's model data, including prohibited gesture processing, as it does user model data 216u from an image capture system 60 which in this example is an audiovisual capture system 60 which sends audio data 217 along with motion tracking data 205l for the user.

Some systems track natural movements of the user's body for control of an avatar with no special sensing devices for the user as illustrated in FIGS. 1A and 1B. In another embodiment, the user may wear sensors on different body parts and the sensor data assists in tracking the user's motions to his onscreen avatar. These two examples allow for the user's natural movements to be directly tracked to a corresponding avatar. Some systems may provide a combination of only a certain number of motions or poses that an avatar can perform for certain body parts or regions, for example the hands and arms, while allow direct tracking of other body parts or regions, for example the legs.

In systems where the user's body movements are mapped to the avatar's movements (e.g. based on image capture of the user, or sensors on the user's body), there can be model data representing the user 216u and model data representing the avatar 216a. Where the avatar's physique is quite different, the motion module 204 performs a mapping between the two models. For example, the boy user 18 is shorter and likely does not have the arm reach of his avatar boxer 64. In other words, if skeletal models were used, they may be the same for the user and the avatar. In some embodiments, however, the application uses the same model data 216 for analyzing the body movements of a user and for directing the motions of the corresponding avatar. In one example, the body model may be implemented as one or more data structures representing body parts and their positions in dimensions and/or rotation angles with respect to a reference. The model data 216 can be updated with updated in terms of absolute positions or with changes in positions and rotations. The changes in positions and rotations may be represented as vectors and angles.

Scene data 218 provides a scene context and defines the other objects in the scene. For example, the scene data 218 is providing a context environment of a boxing match in FIGS. 1A and 1B, and the positions of objects including the ropes of a boxing ring and the existence of the opponent boxer avatar 62. The most recent movements, features and body parts of the other boxer avatar 62, in the scene may be stored as another profile in the avatar profile datastore 214 as well. Updates to scene data 218 may be received by one or more modules such as the avatar display control module 209 or the motion module 204 over the Internet 203 or other network from a remote module or a local scene control module such as scene display processing module 207.

In the example embodiment shown, the avatar control system 202 receives motion tracking data 205 locally from the audiovisual data capture system 60. Additionally, the avatar control system 202 can receive motion tracking data 205i remotely over the Internet 203 or other network. With respect to a user, motion tracking data may comprise the image data itself or a downsampled version of that data. Additionally, depth data, and various forms of data derived from image and/or depth data, can be included in motion tracking data, some examples of which are a model for the body of the user, motion data in mathematical primitives which reference the model, or a bitmask image derived for the user for comparison with a previous state of the model. The avatar control system 202 analyzes this data to recognize motion of the user and track that motion to the user's avatar onscreen.

The motion tracking data 205i may be of the same type received locally 205l. Additionally, the motion tracking data 205i received over a network, particularly in a multiplayer environment, may be motion tracking data with respect to the avatar's model data 216a. Furthermore, motion tracking data 205l and 205i can include commands for motion indicated by input/output devices such as a keyboard, a mouse, a trackball, a gamepad or the like.

As discussed above, some motions and poses, gestures, have special meaning in the context of an entertainment program or other application, and the avatar control system 202 executes instructions to identify them. In particular, the motion module 204 has access to gesture filters 206 stored in memory. In one example, the motion module 204 can select one or more gesture filters 206 based on an associative data index, such as a body part index for example. For example, when a motion tracking data set update is received by the avatar control system 202 and motion changes for certain body parts are indicated, the motion module 204 indexes gesture filters 206 associated with those certain body parts.

The gestures filters 206 execute instructions based on parameter data defining criteria for determining whether a particular gesture has been performed based on motion tracking data 205. In one embodiment, each gesture filter 206 is linked with a library module for a particular gesture in the gestures library 208. Each library module 208 associated with a gesture includes executable instructions to perform processing responsive to the gesture. This processing often involves updating the avatar's motion or image to reflect the gesture in some form.

For example, the boy user 58 in FIG. 1A has a much smaller physique than his avatar 64 boxer. Part of the fun of playing games with avatars is that they often do things better than the user in real-life. The punch of the boy 58 in FIG. 1A in his living room translates into a much more intensive punch by his avatar 64 on the display screen 54. The library module for a "punch" in the boxing game may determine from the acceleration in speed of the user's fist being extended by his elbow, that this is a "power punch" for this user 58 in the game, and his avatar's 64 punch reflects this on the display due to the library punch module's instructions. The instructions may also include other application tasks such as updating a score for example.

The executable instructions of a library module 210 for a prohibited gesture can include alterations or changes to the image data of the avatar in subsequent display updates to avoid depiction of the prohibited gesture. Substitutions 212 for the motions or pose of an obscene or offensive gesture can be incorporated in the library module 210 for the prohibited gesture. In another example, the processing for substituting image data for the prohibited gesture can be separated out into a substitute library module 212 linked to a respective prohibited gesture library module.

For example, there may be an associative array or a database cross-reference linking one or more modules in the prohibited gesture library with one or more modules of substitute image data associated with that prohibited gesture. The substitutes may be linked to the prohibited gestures based on physical characteristics such as common body parts. However, the substitutes may also be linked based on criteria such as similar meaning, similar emotion or a similar emotional intensity. Generally, however, the substitute images are milder in intensity. In one embodiment, substituting image data for a gesture is done by replacing motion data for the gesture with different motion data for the avatar.

Also, the system may include a feature wherein a user may train the system to recognize other prohibited gestures and select or provide substitutes. This may be helpful to parents as they become aware of new offensive gestures.

Applications can also allow users to associate a symbol with his or her avatar, sometimes called a "trophy." The symbol can include a motion or pose, a gesture, which the user assigns by performing it for an image capture system (e.g. 60) which is then processed by the application executing in a computing environment (e.g. 300 or 52). Gestures for trophies can also be checked to see if they are prohibited.

The avatar display control module 209 periodically or in response to a message from the motion module 204 reads updates to the avatar profile(s) 214 and sends image data 219 representing motions or poses for the avatar to the scene display processing module 207 which incorporates the avatar image data 219 with scene data in this example in preparation for rendering the scene on a display system (e.g. 56). In one example, the image data representing motions or poses can be motion tracking data for the avatar. Other examples of image data can be color image data for features of the avatar such as hair, facial features and clothing. The image data 219*l* can be sent locally. Alternatively, if the image data 219*i* representing the avatar's motions or pose is to be transmitted over the Internet 203 or another network, the motion module 204 can notify the avatar display control module 209 to send the image data 219*i* to the appropriate port for network transmission.

The tracking of user motions to the display of the avatar is preferably performed in real time such that the user may interact with an executing application in real time. A real-time display refers to the display of a visual representation of a gesture, wherein the display is simultaneously or almost simultaneously displayed with the performance of the gesture in physical space. For example, an update rate of the display at which the system may provide a display that echoes a user may be at a rate of 20 Hz or higher, wherein insignificant processing delays result in minimal delay of the display or are not visible at all to the user. Thus, real-time includes any insignificant delays pertaining to the timeliness of data which has been delayed by the time required for automatic data processing.

The image capture system 60 recognizes human and non-human targets in a capture area (with or without special sensing devices attached to the subjects), uniquely identifies them and tracks them in three dimensional space.

According to an example embodiment, the image capture system 60 may be configured to capture video with depth information including a depth image that may include depth values via any suitable technique including, for example, time-of-flight, structured light, stereo image, or the like. As shown in FIG. 2, according to an example embodiment, an image camera component 70 may include an IR light component 72, a three-dimensional (3-D) camera 74, and an RGB camera 76 that may be used to capture the depth image of a capture area. For example, in time-of-flight analysis, the IR light component 72 of the capture system 60 may emit an infrared light onto the capture area and may then use sensors to detect the backscattered light from the surface of one or more targets and objects in the capture area using, for example, the 3-D camera 74 and/or the RGB camera 76. In some embodiments, pulsed infrared light may be used such that the time between an outgoing light pulse and a corresponding incoming light pulse may be measured and used to determine a physical distance from the capture system 60 to a particular location on the targets or objects in the capture area. Additionally, in other example embodiments, the phase of the outgoing light wave may be compared to the phase of the incoming light wave to determine a phase shift. The phase shift may then be used to determine a physical distance from the capture system to a particular location on the targets or objects.

According to another example embodiment, time-of-flight analysis may be used to indirectly determine a physical distance from the capture system 60 to a particular location on the targets or objects by analyzing the intensity of the reflected beam of light over time via various techniques including, for example, shuttered light pulse imaging.

In another example embodiment, the capture system 60 may use a structured light to capture depth information. In such an analysis, patterned light (i.e., light displayed as a known pattern such as grid pattern or a stripe pattern) may be projected onto the capture area via, for example, the IR light component 72. Upon striking the surface of one or more targets or objects in the capture area, the pattern may become deformed in response. Such a deformation of the pattern may be captured by, for example, the 3-D camera 74 and/or the RGB camera 76 and may then be analyzed to determine a physical distance from the capture system to a particular location on the targets or objects.

According to another embodiment, the capture system 60 may include two or more physically separated cameras that may view a capture area from different angles, to obtain visual stereo data that may be resolved to generate depth information.

As an example of the synergy provided by these elements, consider that the IR light component 72 and the 3-D camera 74 may provide a depth image of a capture area, but in certain situations the depth image alone may not be sufficient to discern the position or movement of a human target. In those situations, the RGB camera 76 may "take over" or supplement the information from the 3-D camera to enable a more complete recognition of the human target's movement or position. For example, the RGB camera may be used to recognize, among other things, colors associated with one or more targets. If a user is wearing a shirt with a pattern on it that the depth camera may not be able to detect, the RGB camera may be used to track that pattern and provide information about movements that the user is making. As another example, if a user twists, the RGB camera may be use to supplement the information from one or more other sensors to determine the motion of the user. As a further example, if a user is next to another object such as a wall or a second target, the RGB data may be used to distinguish between the two objects. The RGB camera may also be capable of determining fine features of a user such as facial recognition, hair color and the like which may be used to provide additional information. For example, if a user turns backwards, the RGB camera may use hair color and/or the lack of facial features to determine that a user is facing away from the capture system.

The capture system 60 can capture data at interactive rates, increasing the fidelity of the data and allowing the disclosed techniques to process the raw depth data, digitize the objects in the scene, extract the surface and texture of the object, and perform any of these techniques in real-time such that the display (e.g. 56) can provide a real-time depiction of the scene on its display screen (e.g. 54).

Figure 3A:
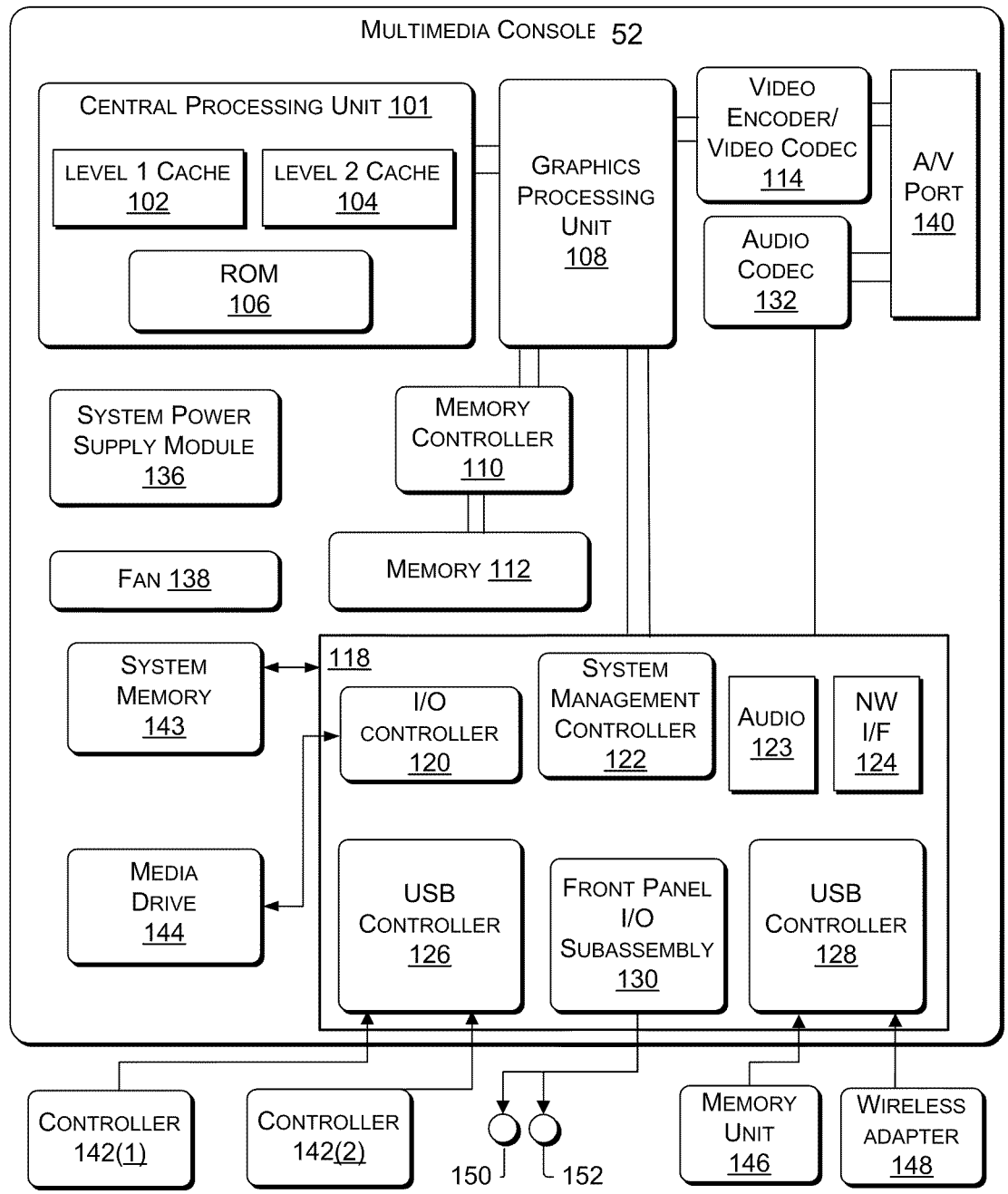
FIG. 3A illustrates an example embodiment of a computing environment in which one or more embodiments for limiting display of a prohibited gesture by an avatar can operate.
Figure 3B:
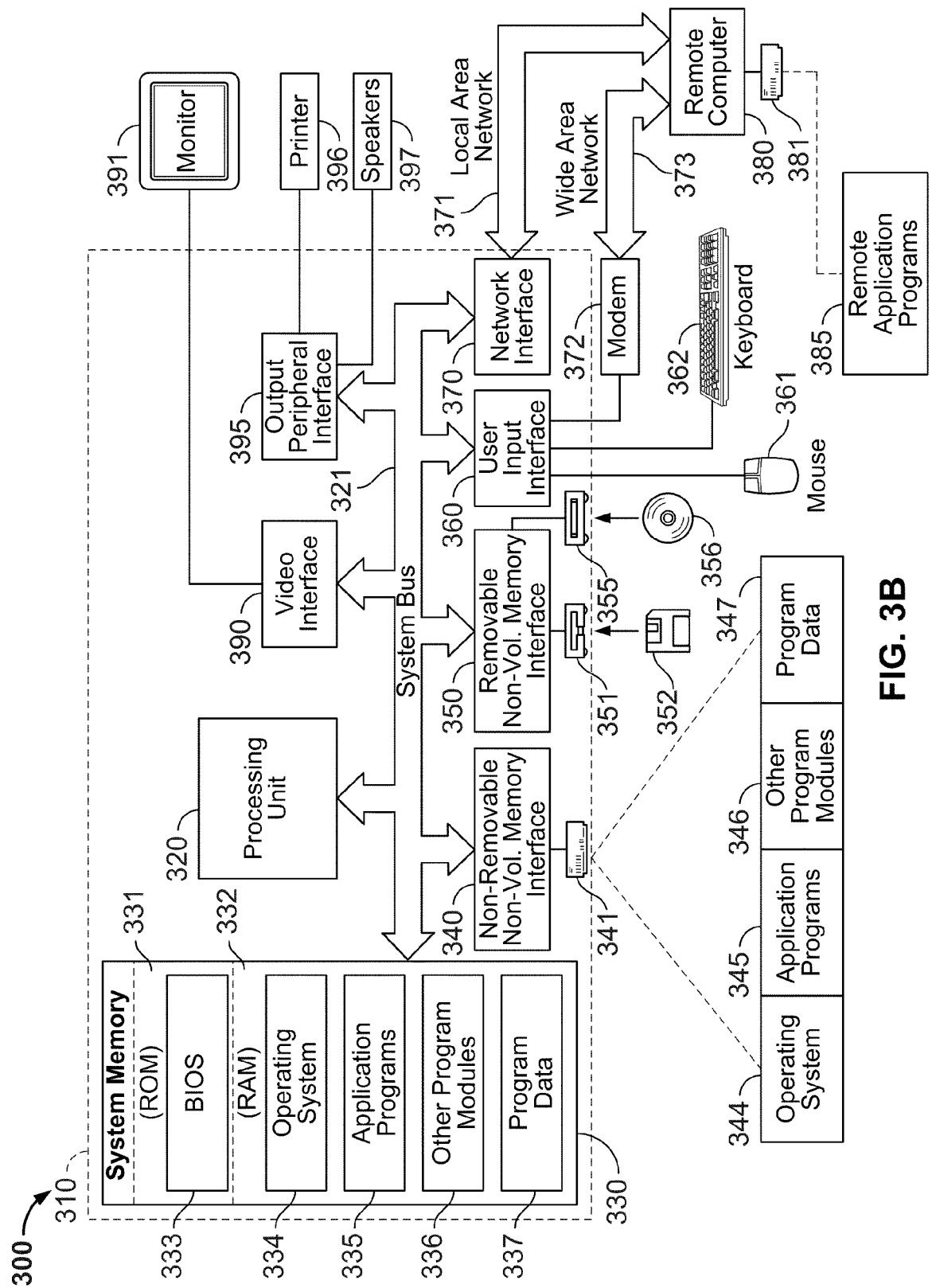
FIG. 3B illustrates a more detailed example embodiment of a computing environment in a game console in which one or more embodiments for limiting display of a prohibited gesture by an avatar can operate.

In the system embodiment of FIG. 2, the image capture system 60 is communicatively coupled 84 to a computing environment such as the computer systems examples in FIGS. 3A-3B. The communication coupling can be implemented in one or more wired or wireless connections such as, for example, a USB connection, a Firewire connection, an Ethernet cable connection, or the like and/or a wireless connection such as a wireless 802.11b, g, a, or n connection.

The capture system 60 further includes a memory component 82 for storing instructions that may be executed by the processor 80, as well as image data which may be captured in a frame format. The memory component 82 may include random access memory (RAM), read only memory (ROM), cache, Flash memory, a hard disk, or any other suitable storage component. In one embodiment, the memory component 82 may be a separate component in communication 90 with the image capture component 70 and the processor 80 as illustrated. According to another embodiment, the memory component 82 may be integrated into the processor 80 and/or the image capture component 70.

The capture system 60 further includes a processor 80 communicatively coupled 90 to the image camera component 70 to control it and the memory 82 for storing image data. The processor 80 may include a standardized processor, a specialized processor, a microprocessor, or the like that may execute instructions that may include instructions for storing profiles, receiving depth image data, storing the data in a specified format in memory 82, determining whether a suitable target may be included in the depth image, converting the suitable target into a skeletal representation or other type of model of the target, or any other suitable instruction. Furthermore, some of this processing may be executed by other processors (e.g. 101, 108, 259, 229, 304, 372) in one or more communicatively coupled computing environments.

The inclusion of processing capabilities in the image capture system 60 enables a model such as a multi-point skeletal model, of a user to be delivered in real-time. In one embodiment, there may be a separate processor for each of multiple components of the capture system, or there may be a single central processor. As another example, there may be a central processor as well as at least one other associated processor. If there is a high cost computing task, the two or more processors may share the processing tasks in any way. The processor(s) may include a memory as described above and the memory may store one or more user profiles. These profiles may store body scans, typical modes of usage or play, age, height, weight information, names, avatars, high scores or any other information associated with a user and usage of the system.

The capture system 60 may further include a microphone 78 which can be used to receive audio signals produced by the user. Thus, in this embodiment, the image capture system 60 is an audiovisual data capture system. The microphone(s) in the capture system may be used to provide additional and supplemental information about a target to enable the system to better discern aspects of the target's position or movement. For example, the microphone(s) may comprise directional microphone(s) or an array of directional microphones that can be used to further discern the position of a human target or to distinguish between two targets. For example, if two users are of similar shape or size and are in a capture area, the microphones may be used to provide information about the users such that the users may be distinguished from each other base, for example, on recognition of their separate voices. As another example, the microphones may be used to provide information to a user profile about the user, or in a 'speech to text' type embodiment, where the at least one microphone may be used to create text in a computing system.

Pixel data with depth values for an image is referred to as a depth image. According to one embodiment, the depth image may include a two-dimensional (2-D) pixel area of the captured scene where each pixel in the 2-D pixel area has an associated depth value such as a length or distance in, for example, centimeters, millimeters, or the like of an object in the captured scene from a point of reference, e.g. with respect to some aspect of the camera component 70. For example, the depth values for the pixels may be represented in "Z layers," which are layers that may be perpendicular to a Z axis extending from the depth camera 70 along its line of sight. These depth values may be referred to collectively as a depth map.

A depth image may be downsampled to a lower processing resolution such that the depth image may be more easily used and/or more quickly processed with less computing overhead. For example, various regions of the observed depth image can be separated into background regions and regions occupied by the image of the target. Background regions can be removed from the image or identified so that they can be ignored during one or more subsequent processing steps. Additionally, one or more high-variance and/or noisy depth values may be removed and/or smoothed from the depth image. Portions of missing and/or removed depth information may be filled in and/or reconstructed. Such backfilling may be accomplished by averaging nearest neighbors, filtering, and/or any other suitable method. Other suitable processing may be performed such that the depth information may be used to generate a model such as a skeletal model.

FIG. 3A illustrates a detailed example of an embodiment of a computing environment that may be used in a gaming console like that in FIGS. 1A-2 in which one or more embodiments for limiting display of a prohibited gesture by an avatar can operate. As shown in FIG. 3A, the multimedia console 52 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 52 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an NV (audio/video) port 140 for transmission to a television or other display. A memory controller 110 is connected to the GPU 108 to facilitate processor access to various types of memory 112, such as, but not limited to, a RAM (Random Access Memory).

The multimedia console 52 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 52. The media drive 144 is connected to the I/O controller 120 via a bus, such as a Serial ATA bus or other high speed connection (e.g., IEEE 1394).

In one embodiment, a copy of the software and data for the avatar control system 202 can be stored on media drive 144 and can be loaded into system memory 143 when executing.

The system management controller 122 provides a variety of service functions related to assuring availability of the multimedia console 52. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 52. A system power supply module 136 provides power to the components of the multimedia console 52. A fan 138 cools the circuitry within the multimedia console 52.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 52 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 52.

The multimedia console 52 may be operated as a standalone system by simply connecting the system to a television or other display. In this standalone mode, the multimedia console 52 allows one or more users to interact with the system, watch movies, or listen to music. However, with the integration of broadband connectivity made available through the network interface 124 or the wireless adapter 148, the multimedia console 52 may further be operated as a participant in a larger network community.

When the multimedia console 52 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 52 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The image capture system 60 may define additional input devices for the console 52 (e.g. for its camera system).

FIG. 3B illustrates another example embodiment of a computing environment such as a personal computer.

With reference to FIG. 3B, an exemplary system for implementing the technology includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3B illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through an non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3B, provide storage of computer readable instructions, data structures, program modules and other data for the computer 310. In FIG. 3B, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 20 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through a output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

Figure 4:
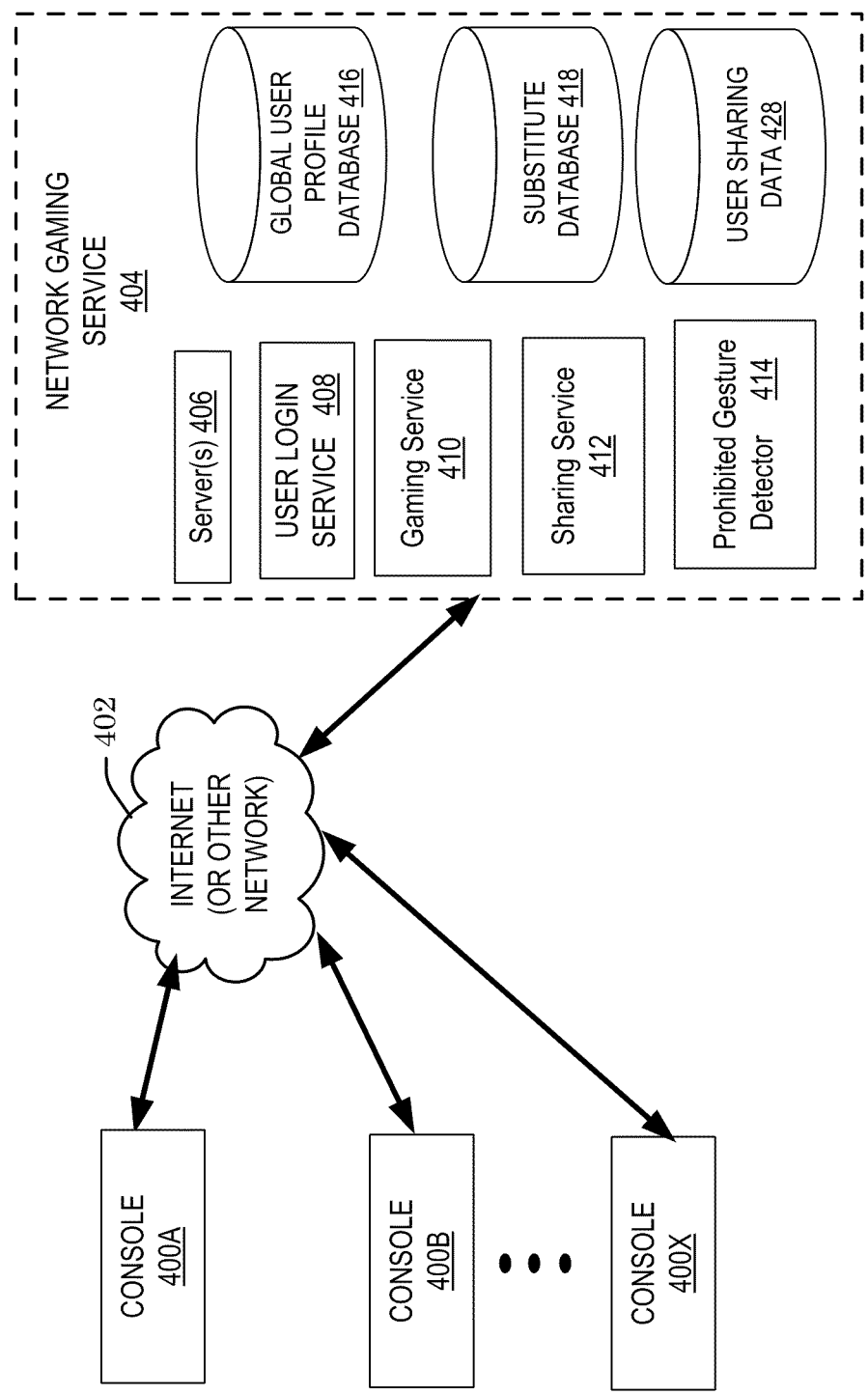
FIG. 4 illustrates an example embodiment of a target recognition, analysis, and tracking system including an image capture system that may be used with one or more embodiments.

FIG. 4 illustrates an example embodiment of a networked computing environment in which one or more embodiments for limiting display of a prohibited gesture by an avatar can operate. As shown in FIG. 4, multiple consoles 400A-400X or processing devices, such as those illustrated in FIGS. 3A and 3B may be coupled to a network 402 and can communicate with each other and a network gaming service 404 having one or more server(s) 406 via network 402. The server(s) 406 may include a communication component capable of receiving information from and transmitting information to consoles 400A-X and may provide a collection of services that applications running on consoles 400A-X may invoke and utilize.

Consoles 400A-X may invoke user login service 408, which is used to authenticate and identify a user on consoles 400A-X. During login, login service 408 obtains a gamer tag (a unique identifier associated with the user) and a password from the user as well as a console identifier that uniquely identifies the console that the user is using and a network path to the console. The gamer tag and password are authenticated by comparing them to a global user profile database 416, which may be located on the same server as user login service 408 or may be distributed on a different server or a collection of different servers. Once authenticated, user login service 408 stores the console identifier and the network path in the global user profile database 416 so that messages and information may be sent to the console.

In an embodiment, consoles 400A-X may include a gaming service 410, a sharing service 412, a prohibited gesture detector, user sharing data 428 and a substitution database 418. The gaming service may allow users to play online interactive games, create and share gaming environments for joint game play between consoles, and provide other services such as an online marketplace, centralized achievement tracking across various games and other shared experience functions. A sharing service 412 allows users to share game play elements with other users. For example, a user on a console 400x may create elements for use in games and share them or sell them to other users. In addition, a user may record elements of the game play experience, such as a movie of a race or various scenes in a game, and share them with other users. Information provided by users for sharing or sale may be stored in the user sharing data 428.

The global user profile database 416 may include information about all the users on consoles 400A-X such as the users' account information and a console identifier that uniquely identifies a particular console that each user is using. The global user profile database 416 may also include user preference information associated with all the users on consoles 400A-X. The global user profile database 416 may also include information about users such as game records and a friends list associated with users.

A prohibited gesture detector may be provided in the gaming service 404. The prohibited gesture detector can detect prohibited gestures and movements in game play elements uploaded to the server and stored in user sharing data 428. A substitute gestures database may include substitute gestures for use in replacing prohibited gestures uploaded to user sharing data in database 428.

Any number of networked processing devices may be provided in accordance with a gaming system as provided in FIG. 4. As such, the technology presented herein may operate on one or more servers 406 in conjunction with a gaming service 404 or may be provided in individual processing devices in a networked environment, such as devices 400A-400x.

Target Determination

The target recognition, analysis and tracking system 50 may determine whether the depth image includes a human target. In one embodiment, the edges of each target such as the human target and the non-human targets in the captured scene of the depth image may be determined. As described above, each of the depth values may represent a depth value such as a length or distance in, for example, centimeters, millimeters, or the like of an object in the captured scene from the camera 70. According to an example embodiment, the edges may be determined by comparing various depth values associated with, for example, adjacent or nearby pixels of the depth image. If the various depth values being compared are greater than a predetermined edge tolerance, the pixels may define an edge. In one embodiment, the predetermined edge tolerance may be, for example, a 100 millimeters. If a pixel representing a depth value of 1000 millimeters may be compared with an adjacent pixel representing a depth value of 1200 millimeters, the pixels may define an edge of a target, because the difference in the length or distance between the pixels is greater than the predetermined edge tolerance of 100 mm.

According to another embodiment, predetermined points or areas on the depth image may be flood filled to determine whether the depth image includes a human target. For example, various depth values of pixels in a selected area or point of the depth image may be compared to determine edges that may define targets or objects as described above. In an example embodiment, the predetermined points or areas may be evenly distributed across the depth image. For example, the predetermined points or areas may include a point or an area in the center of the depth image, two points or areas in between the left edge and the center of the depth image, two points or areas between the right edge and the center of the depth image, or the like.

The Z values of the Z layers may be flood filled based on the determined edges. For example, the pixels associated with the determined edges and the pixels of the area within the determined edges may be associated with each other to define a target or an object in the capture area that may be compared with a pattern.

According to an example embodiment, each of the flood-filled targets, human and non-human may be matched against a pattern to determine whether and/or which of the targets in the capture area include a human. The pattern may include, for example, a machine representation of a predetermined body model associated with a human in various positions or poses such as a typical standing pose with arms to each side.

Identifying and Representing the Body Parts in Data

In an example embodiment, the human target may be isolated and a bitmask of the human target may be created to scan for one or more body parts. For example, after a valid human target is found within the depth image, the background or the area of the depth image not matching the human target can be removed. A bitmask may then be generated for the human target that may include values of the human target along, for example, an X, Y, and Z axis. According to an example embodiment, the bitmask of the human target may be scanned for various body parts, starting with, for example, the head to generate a model of the human target. The top of the bitmask may be associated with a location of the top of the head. After determining the top of the head, the bitmask may be scanned downward to then determine a location of a neck, a location of shoulders, and the like. The depth map or depth image data can be updated to include a probability that a pixel is associated with a particular virtual body part in the model.

According to an example embodiment, upon determining the values of a body part, a data structure may be created that may include measurement values such as length, width, or the like of the body part associated with the bitmask of the human target. In one embodiment, the data structure for the body part may include results averaged from a plurality of depth images captured in frames by the capture system 60 at a frame rate. The model may be iteratively adjusted at a certain number of frames. According another embodiment, the measurement values of the determined body parts may be adjusted such as scaled up, scaled down, or the like such that measurements values in the data structure more closely correspond to a typical model of a human body. A body model may contain any number of body parts, each of which may be any machine-understandable representation of the corresponding part of the modeled target.

In a model example including two or more body parts, each body part of the model may comprise one or more structural members (i.e., "bones"), with joints located at the intersection of adjacent bones. For example, measurement values determined by the bitmask may be used to define one or more joints in a skeletal model. The one or more joints may be used to define one or more bones that may correspond to a body part of a human. Each joint may allow one or more body parts to move relative to one or more other body parts. For example, a model representing a human target may include a plurality of rigid and/or deformable body parts, wherein some body parts may represent a corresponding anatomical body part of the human target. Each body part may be characterized as a mathematical vector defining joints and bones of the skeletal model. It is to be understood that some bones may correspond to anatomical bones in a human target and/or some bones may not have corresponding anatomical bones in the human target.

Figure 5B:
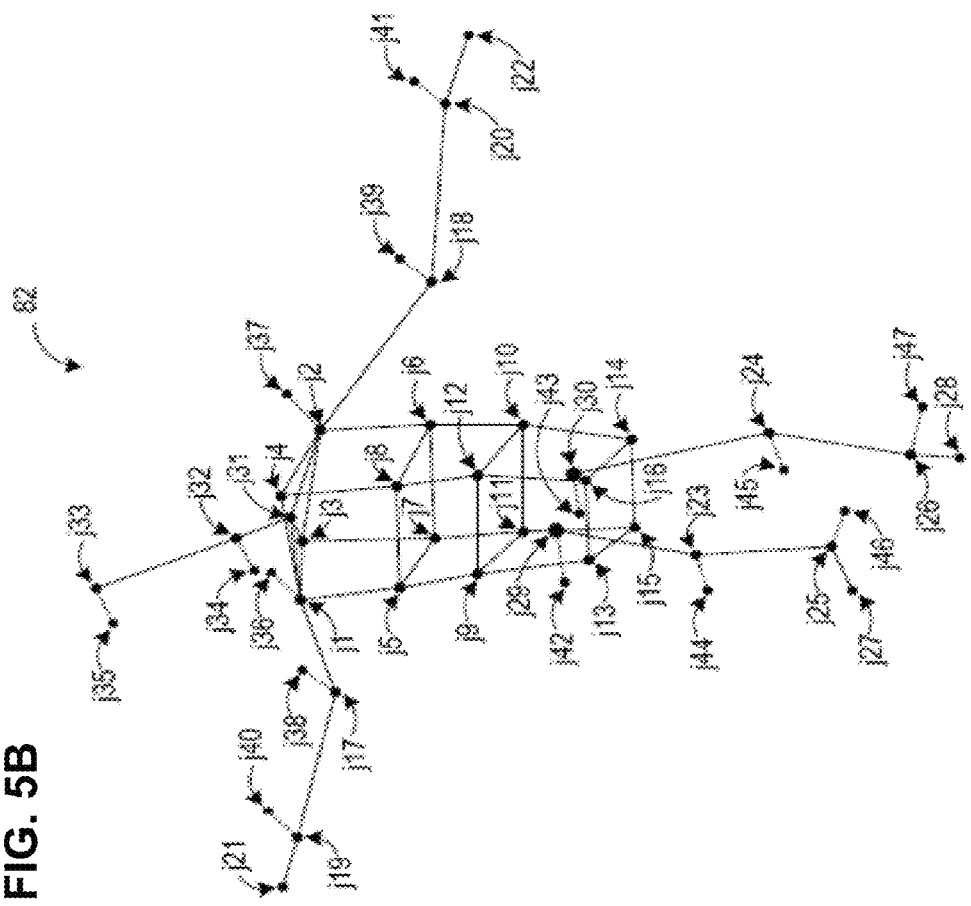
FIG. 5B illustrates another exemplary model of a user in a skewed view that can be used by one or more embodiments.
Figure 5A:
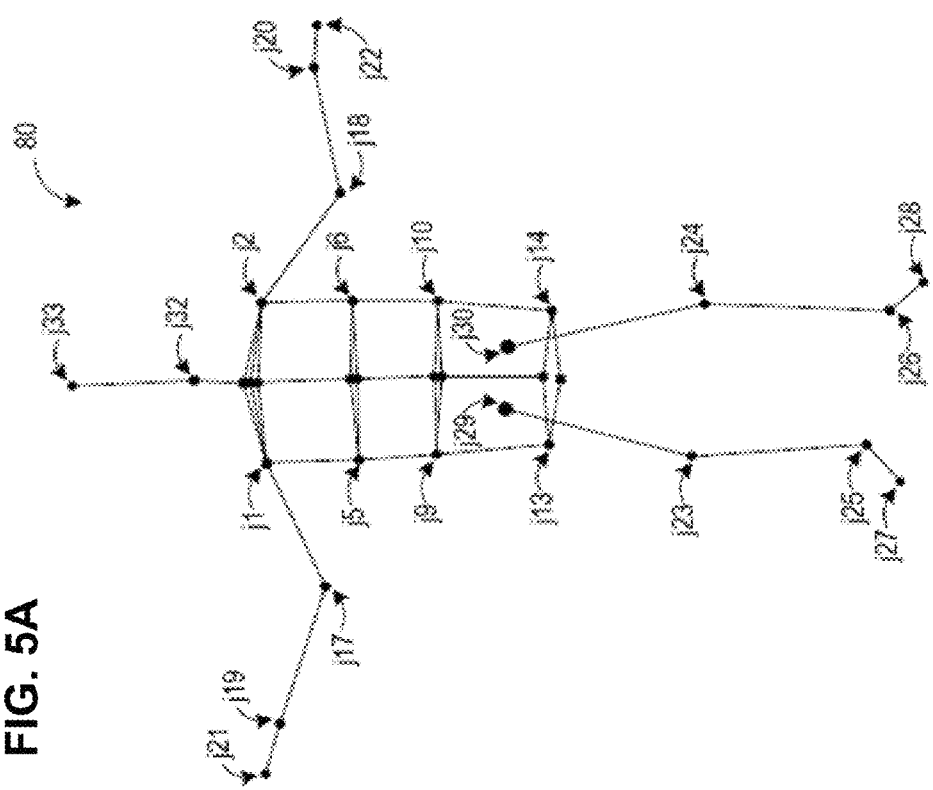
FIG. 5A illustrates an exemplary skeletal model of a user as viewed from the front that can be used by one or more embodiments.

The bones and joints may collectively make up a skeletal model, which may be a constituent element of another model. The skeletal model may include one or more skeletal members for each body part and a joint between adjacent skeletal members. Exemplary three-dimensional skeletal models, skeletal model 407 and exemplary skeletal model 408 are shown in FIGS. 5A and 5B, respectively. FIG. 5A shows a skeletal model 407 as viewed from the front, with joints j1 through j33. The skeletal model 407 may include one or more joints j1-j33. According to an example embodiment, each of the joints j1-j33 may enable one or more body parts defined there between to move relative to one or more other body parts and to move independently of each other. For example, the bone defined between the joints j17 and j19 corresponds to a forearm that may be moved independent of, for example, the bone defined between joints j23 and j25 that corresponds to a calf.

FIG. 5B shows a skeletal model 408 as viewed from a skewed view, also with joints j1 through j33. Skeletal model 408 further includes roll joints j34 through j47, where each roll joint may be utilized to track axial roll angles. For example, an axial roll angle may be used to define a rotational orientation of a limb relative to its parent limb and/or the torso. For example, if a skeletal model is illustrating an axial rotation of an arm, roll joint j40 may be used to indicate the direction the associated wrist is pointing (e.g., palm facing up). Thus, whereas joints can receive forces and adjust the skeletal model, as described below, roll joints may instead be constructed and utilized to track axial roll angles. More generally, by examining an orientation of a limb relative to its parent limb and/or the torso, an axial roll angle may be determined. For example, if examining a lower leg, the orientation of the lower leg relative to the associated upper leg and hips may be examined in order to determine an axial roll angle.

Joints and Bones and Applying Force Vectors

As the user moves in physical space, as captured by image capture system 60, the resultant image data may be used to adjust the skeletal model such that the skeletal model may accurately represent the user. According to an example embodiment, the model can be rasterized into a synthesized depth image. Rasterization allows the model described by mathematical vectors, polygonal meshes, or other objects to be converted into a synthesized depth image described in terms of pixels. Differences between an observed image of the target, as retrieved by a capture system, and a rasterized (i.e., synthesized) image of the model may be used to determine the force vectors that are applied to the model in order to adjust the body into a different pose. In one embodiment, one or more force vectors may be applied to one or more force-receiving aspects of a model to adjust the model into a pose that more closely corresponds to the pose of the target in the physical space of the capture area. The model may be iteratively adjusted as frames are captured. Depending on the type of model that is being used, the force vector may be applied to a joint, a centroid of a body part, a vertex of a triangle, or any other suitable force-receiving aspect of the model. Furthermore, in some embodiments, two or more different calculations may be used when determining the direction and/or magnitude of the force.

Constraints

The visual appearance of an on-screen character may be changed in response to changes to the skeletal model being tracked as well as constraints. Maintaining the integrity of the skeletal model when applying forces can result from one or more constraints being applied. A variety of different constraints can be enforced to maintain the integrity of different possible model types.

During each iteration of rectifying the model, constraints may be gently and/or gradually applied to a movement or a pose, in order to limit the set of actions and gestures to those that are physically expressible by one or more actual bodies of one or more targets. A skeletal model may additionally or alternatively be constrained by computing a length of each skeletal member based on the target, such that these lengths may be used as constraints during rectification. For example, the dimensions of various parts of the target's body (e.g. arm length, hip width, head size, etc.) can be determined by rendering various versions of the body model, using varied dimensions in each rendering, and selecting the dimensions of the rendering that most closely matches the target according to one or more suitable metrics. In another example, a single rendering may be made, and the proper body dimensions can be deduced by analysis of the particular areas where the rendering does, and does not, match the observed depth image. In some embodiments, knowledge that different portions of a target can move a limited distance in a time frame (e.g., $\frac{1}{30}$th or $\frac{1}{60}$th of a second) can be used as a constraint in obtaining a model. Such a constraint may be used to rule out certain poses when a prior frame is known.

In regards to joint angle constraints, certain limbs and body parts may be limited in their range of motion relative to an adjacent body part. Additionally, this range of motion may change based on the orientation of adjacent body parts. Thus, applying joint angle constraints may allow limb segments to be constrained to possible configurations, given the orientation of parent limbs and/or body parts.

Figure 6A:
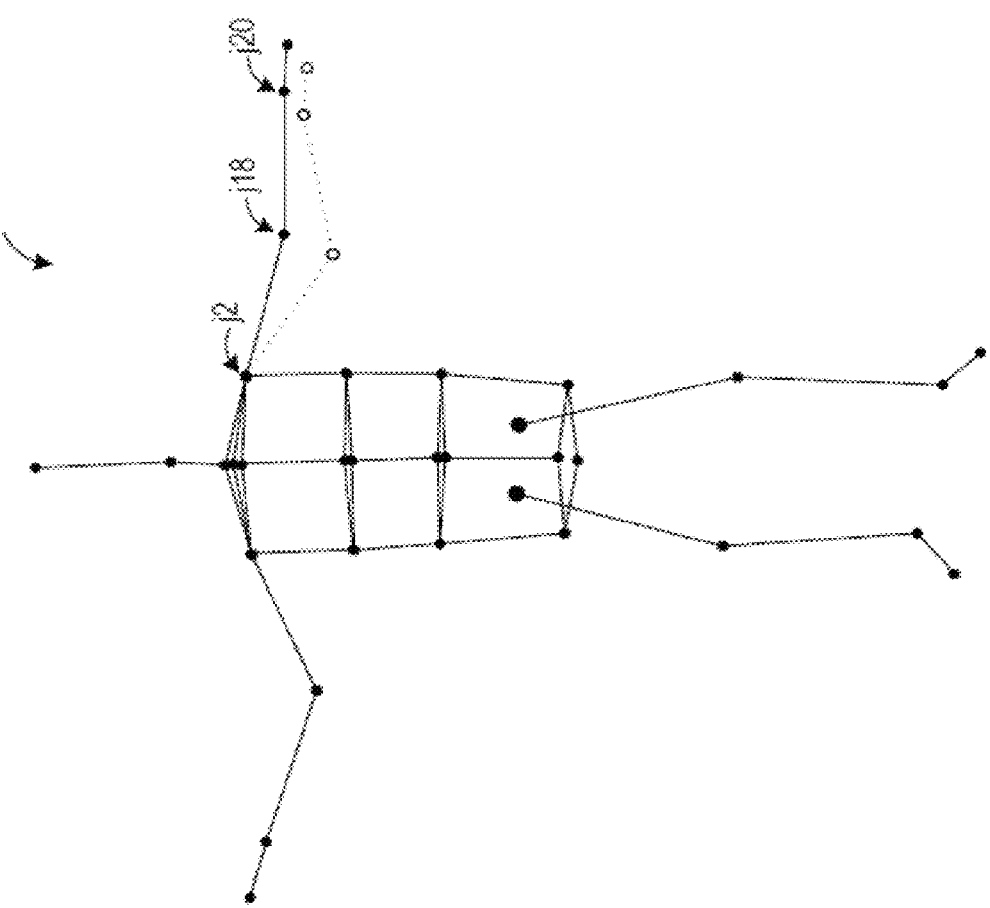
FIGS. 6A and 6B shows an example application of and the result of applying force to force-receiving locations of a model.
Figure 6B:
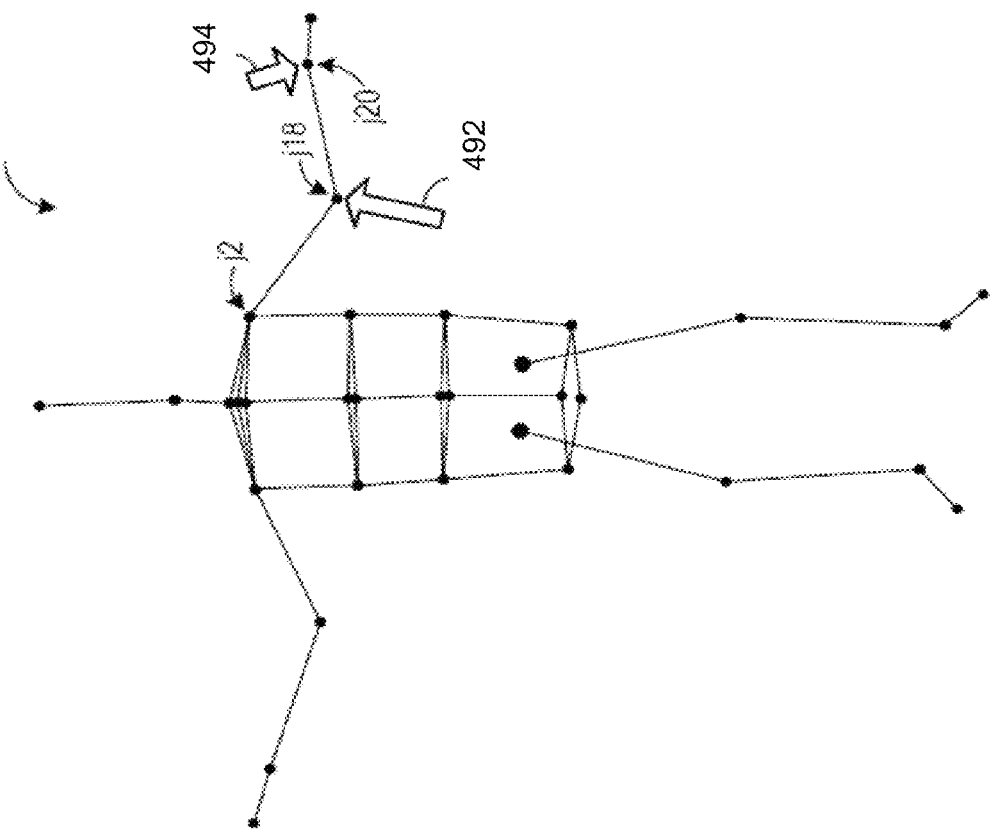
Figure 6D:
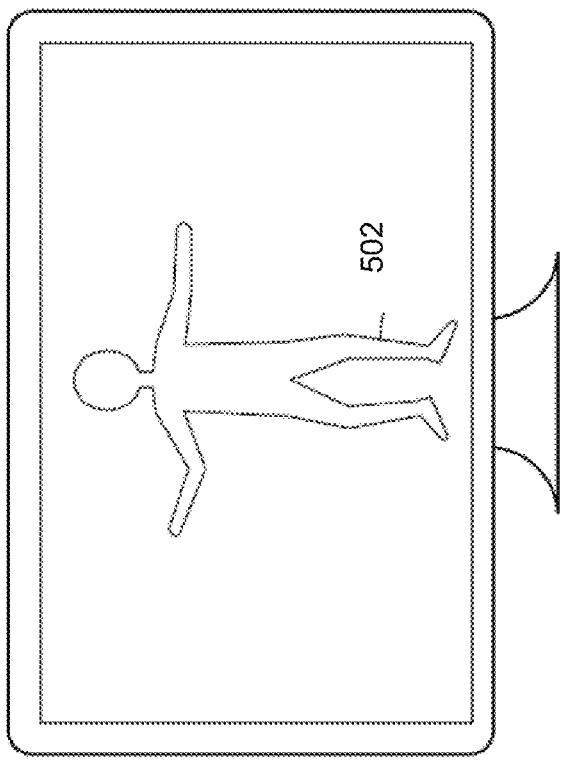
FIGS. 6C and 6D show a player avatar rendered from the models of FIGS. 6A and 6B.
Figure 6C:
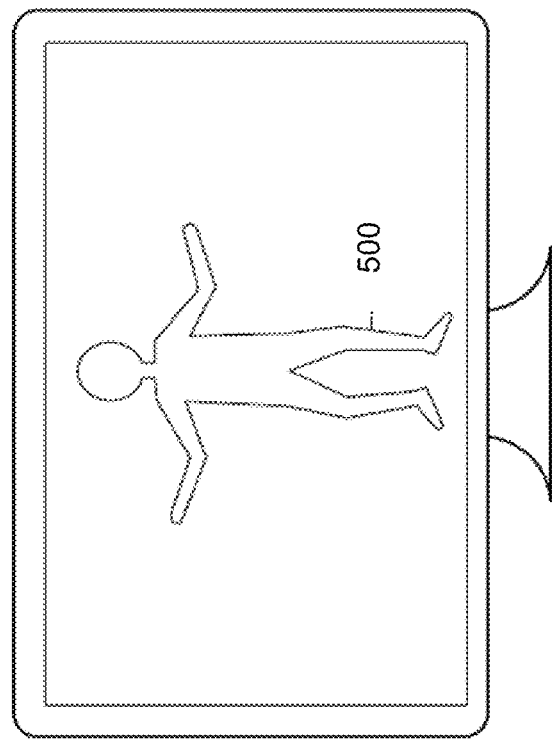

FIGS. 6A and 6B shows an example application of and the result of applying force to force-receiving locations of a model. FIG. 6A shows a skeletal model 407, where force vector 492 is to be applied to joint j18 (i.e., an elbow) and force vector 494 is to be applied to joint j20 (i.e., a wrist), for the purpose of straightening one arm of skeletal model 407 to more closely match an observed depth image. FIG. 6C illustrates the visual appearance of an on-screen avatar 500 representative of the user's model of FIG. 6A. FIG. 6B shows the skeletal model 409 after the forces are applied. FIG. 6B illustrates how the applied forces adjust the pose of the model. As shown in FIG. 6B, the lengths of the skeletal members may be preserved. As further shown, the position of joint j2 remains at the shoulder of the skeletal model, as expected for the case of a human straightening an arm. In other words, the skeletal model remains intact after the forces have been applied. Responsive to changes to the model, such as changes shown in FIG. 6B, the avatar control system 202 causes the audiovisual display system 56 to display the adjusted player avatar 502 with a straightened arm as shown in FIG. 6D.

A model of a target can be variously configured without departing from the scope of this disclosure. In some examples, a model may include one or more data structures that represent a target as a two-dimensional or three-dimensional model comprising rigid and/or deformable shapes, or body parts. Each body part may be characterized as a mathematical primitive, examples of which include, but are not limited to, spheres, anisotropically-scaled spheres, cylinders, anisotropic cylinders, smooth cylinders, boxes, beveled boxes, prisms, and the like.

As described above, some models may include a skeleton and/or body parts that serve as a machine representation of a modeled target. In some embodiments, a model may alternatively or additionally include a wireframe mesh, which may include hierarchies of rigid polygonal meshes (e.g. triangles), one or more deformable meshes, or any combination of the two arranged in a mesh that defines the shape of the body model. Such a mesh may include bending limits at each polygonal edge. In other examples, some models may include patches, non-uniform rotation B-splines, or other higher-order surfaces. A model may also include surface textures and/or other information to more accurately represent clothing, hair, and/or other aspects of a modeled target.

The target recognition, analysis and tracking system may render and store a motion capture file that may include one or more motions. Some examples of such motions are a waving motion, a swinging motion such as a golf swing, a punching motion, a walking motion, a running motion, or the like specific to the user. According to one embodiment, the motion capture file may be generated in real-time based on the information associated with the tracked model. For example, in one embodiment, the motion capture file may include, for example, the vectors including the X, Y, and Z values that may define the joints and bones of the model as it is being tracked at various points in time.

In one example embodiment, a user may be prompted to perform various motions that may be captured in the motion capture file. For example, an interface may be displayed that may prompt the user to, for example, walk or perform a golf swing motion. As described above, the model being tracked may then be adjusted based on those motions at various points in time and a motion capture file of the model for the prompted motion may be generated and stored.

According to one embodiment, the motion capture file may include frames corresponding to, for example, a snapshot of the motion of the user at different points in time. Upon capturing the tracked model, information associated with the model including any movements or adjustment applied thereto at a particular point in time may be rendered in a frame of the motion capture file. The information in the frame may include, for example, the vectors including the X, Y, and Z values that may define the joints and bones of the tracked model and a time stamp that may be indicative of a point in time in which, for example, the user performed the movement corresponding to the pose of the tracked model.

For example, model 408, shown in FIG. 6B, may correspond to a point in time when a user initially straightens his or her left elbow. This movement, including information such as the X, Y, and Z values of the joints and bones for the movement may be rendered in, for example, a first frame of the motion capture file having a first time stamp associated with the point in time after the user straightens his or her left arm.

Similarly, in FIG. 6B, the model straightens wrist joint j20 responsive to a similar movement by the user, and this movement may correspond to a later point in time. The movements including information such as the X, Y, and Z values of the joints and bones for them may be rendered in, for example, respective first and second frames of the motion capture file having respective first and second time stamps associated with different points in time of the user extending his or her elbow and wrist.

The motion capture file may be applied to an avatar or game character. For example, the target recognition, analysis and tracking system may apply one or more motions of the tracked model captured in the motion capture file to an avatar or game character such that the avatar or game character may be animated to mimic motions performed by the user such as the user 58 described above with respect to FIGS. 1A and 1B. In an example embodiment, the joints and bones in the model captured in the motion capture file may be mapped to particular portions of the game character or avatar. For example, the joint associated with the left elbow j18 may be mapped to the left elbow of the avatar or game character (e.g. 502 in FIG. 6D). The left elbow may then be animated to mimic the motions of the left elbow associated with the model of the user in each frame of the motion capture file.

According to an example embodiment, the target recognition, analysis and tracking system may apply the one or more motions as the motions are captured in the motion capture file. Thus, when a frame is rendered in the motion capture file, the motions captured in the frame may be applied to the avatar or game character such that the avatar or game character may be animated to immediately mimic the motions captured in the frame.

In another embodiment, the target recognition, analysis and tracking system may apply the one or more motions after the motions may be captured in a motion capture file. For example, a motion such as a walking motion may be performed by the user and captured and stored in the motion capture file. The walking motion may then be applied to the avatar or game character each time the user lifts his or her leg as a gesture or command that causes the avatar to walk. The avatar may then begin walking and may be animated based on the walking motion associated with the user and stored in the motion capture file. Thus, the visual appearance of an on-screen character may be changed in response to the motion capture file. Furthermore, the on-screen avatar may be animated to mimic the actual motion of the user. For example, the avatar is animated to swing a golf club exactly like the user swings a golf club as captured in the motion capture file.

A model such as a skeletal model (e.g. 407 or 700) provides a common reference basis for different modules in the avatar control system 202, such as the motion module 204 and the avatar display control module 209, to analyze the user's motions and display motions of the avatar which track them.

For more detailed information on an image capture system and its processing that can be used with the present technology, reference may be made to the following applications: Environment And/Or Target Segmentation", filed May 29, 2009 and hereby fully incorporated herein by reference; U.S. patent application Ser. No. 12/603,437, "Pose Tracking Pipeline," filed on Oct. 21, 2009, and hereby fully incorporated herein by reference; U.S. patent application Ser. No. 12/475,308, "Device for Identifying and Tracking Multiple Humans Over Time," filed on May 29, 2009, and hereby fully incorporated herein by reference; "Motion Detection Using Depth Images," filed on Dec. 18, 2009, and hereby fully incorporated herein by reference; U.S. patent application Ser. No. 12/575,388, "Human Tracking System," filed on Oct. 7, 2009, and hereby fully incorporated herein by reference.

Gesture Determination

In one or more embodiments for capturing a user's natural movements, the capture system 60 repeatedly sends data 205*l* for motion tracking to the communicatively coupled motion module 204 in order to update the scene on the display screen 54 as the user moves in time. In the examples above, the motion tracking data may include data referenced with respect to some form of a skeletal model such as vectors with respect to different joints, centroids or nodes to illustrate movement changes. Such changes may be captured in a motion capture file. The data may be referenced to a synthesized pixel data representation created from rasterizing the vector data. The data may also include a bitmask of the user for comparison on each update to detect which body parts are moving. Each body part is indexed so it can be identified, other parts of the capture area such as the furniture in the living room are identified as background, and the users are indexed so the machine representable data for their respective body parts can be linked to them.

The motion module 204 can use indices to identify which body parts have changed position between updates. For different body parts, there are associated gesture filters 206. A gesture filter 206 includes instructions for determining whether the movements indicated in the update 205 or a series of updates represents a gesture, which can be a movement itself or a resulting pose. As discussed previously, gestures have meaning, generally in the context of the application, but they can also have meanings not related to the application, which are offensive in different cultures. The motion module 204 has specific gesture filters for these actions, hereafter referenced as prohibited gestures, with which it compares the motion tracking data associated with various body parts in order to recognize them.

In one embodiment, a gesture filter 206 executing instructions comparing the motion tracking data for one or more body parts involved with the gesture with parameters including criteria relating to motion characteristics which define the gesture. Some examples of motion characteristics include position, angle, speed and acceleration. For instance, a throw, may be implemented as a gesture comprising information representing the movement of one of the hands of the user from behind the rear of the body to past the front of the body, as that movement would be captured by a depth camera. Some examples of a parameter for the "throw" may be a threshold velocity that the hand has to reach, a distance the hand must travel (either absolute, or relative to the size of the user as a whole), and a direction of movement of the hand from behind the body to past its front. The parameters can be stored as metadata for its corresponding gesture. A parameter may comprise any of a wide variety of motion characteristics for a gesture. Where the filter comprises a parameter, the parameter value can take different forms, for example, it may be a threshold, an absolute value, a fault tolerance or a range.

Some more examples of motion characteristics that may be represented by parameters are as follows: body parts involved in the gesture, angles of motion with respect to a body part, a joint, other body parts or a center of gravity of the user's body as represented by his skeletal model, changes in position of a body part or whole body, and distances moved by a body part or whole body. Additionally, other examples of characteristics are a location of a volume of space around the user's body in which a body part moves, a direction of movement, a velocity of movement of a body part, a place where a movement occurs, an angle between a body part and another object in the scene, an acceleration threshold, the time period of the gesture, the specific time of the gesture, and a release point.

In an embodiment, the value of the parameter is determined by an end user of the application through making a gesture. For instance, an application may allow the user to train it, so that the user is able to specify what motions he believes a gesture should comprise. This may be beneficial to allow a user without good control over his motor skills to be able to link what motions he can make with a corresponding gesture. If this were not available, the user may become frustrated because he is unable to make his body move in the manner required by the application to produce the gesture. For instance, given a baseball video game where a pitcher may throw a pitch at any integer velocity between 50 mph and 105 mph, inclusive, and that velocity is based on the user's maximum arm velocity in making the gesture, it may be cumbersome to define a separate set of parameters for each of those 56 possible velocities. Instead, the application may be given an indication that the gesture occurred along with the maximum arm velocity of the user, and then the application may use internal logic to determine how fast the corresponding pitcher avatar should throw the pitch.

In an embodiment, the user also uses his voice to make, augment, distinguish or clarify a gesture. In this embodiment, the motion module 204 receives voice data and determines that a combination of the data and the voice data is indicative of the gesture. For instance, a user may be able to make a singing gesture by opening and closing his mouth, but also specify a specific note of that singing gesture by singing that note. Additionally, the user may be able to make a "strong punch" gesture as opposed to a "regular punch" gesture by shouting while making the otherwise "regular punch" gesture.

In one example, a gesture filter's 206 criteria references a skeletal model like one or more of those shown in FIGS. 5A-7 stored in model data 216. The filter may comprise code and associated data that can process depth values, or vectors with respect to the skeletal data, or color image data or a combination of two or more of these when determining whether the parameter criteria are satisfied. For example, inputs to a filter may comprise things such as joint data about a user's joint position, angles formed by the bones that meet at the joint, RGB color data of a user which can be helpful for collision testing, and the rate of change of an aspect of the user. The input data 205 may be presented as changes occur in position, speed, direction of movement, joint angle etc. with a previous positioning data set for the one or more body parts involved in the gesture.

Whether there is a match or not can be represented by one or more outputted confidence levels. In one example, the confidence level could be implemented on a linear scale that ranges over floating point numbers between 0 and 1, inclusive. In an embodiment, determining the confidence level may comprise a boolean determination based on the parameters associated with the filter. For example, each parameter may have its own associated confidence level that the motion characteristic associated with it is being made and which the motion module 204 may retrieve for its gesture determination. A weighting may be given each parameter and its confidence level which may be used by a weighting technique to determine a confidence level that the gesture as a whole is being made.

Additionally, there may be an output of a motion characteristic for a given gesture. Examples of a motion characteristic include a time, speed, acceleration rate or angle at which a gesture is made. The avatar control display module 209 can incorporate the motion characteristic in the image data 219 for the avatar.

In one embodiment, the motion module 204 maintains an input-over-time archive that tracks recognized gestures and other motion. For example, a motion capture file can be saved for the skeletal data changes for a session or instance (e.g. game) of an application. In one example, the motion module 204 implements a Hidden Markov Model where the modeled system is assumed to be a Markov process—one where a present state encapsulates any past state information necessary to determine a future state, so no other past state information must be maintained for this purpose—with unknown parameters, and hidden parameters being determined from the observable data.

Figure 7:
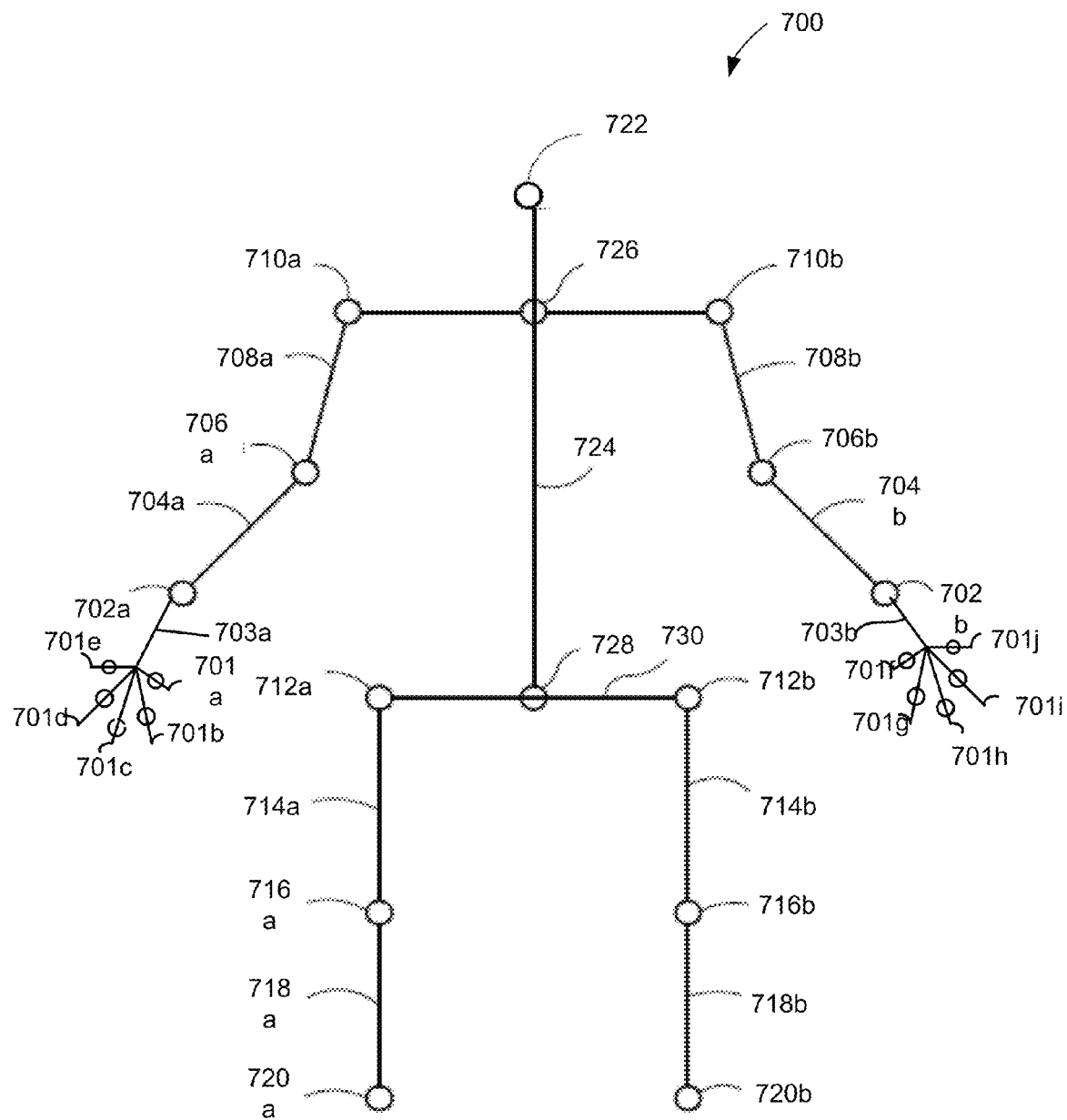
FIG. 7 illustrates another example of a skeletal model of a user that can be used by one or more embodiments.

Some examples of gestures and the parameters their corresponding filters would include for the motion module 204 to analyze are provided for illustrative purposes with reference to a more simplified skeletal mapping 700 of a user in FIG. 7 that can be used by one or more embodiments of the present technology. The example skeletal mapping 700 of a user may have been generated from the motion tracking data 205 captured by the audiovisual data capture system 60. In this embodiment, a variety of joints and bones are identified: each finger, 701a-701j, each hand 703a, 703b, each wrist 702a, 702b, each forearm 704a, 704b, each elbow 706a, 706b, each bicep 708a, 708b, each shoulder 710a, 710b, each hip 712a, 712b, each thigh 714a, 714b, each knee 716a, 716b, each foreleg 718a, 718b, each foot 720a, 720b, a head 722, a torso 724, a top 726 and bottom 728 of the spine, and a waist 730. Where more points are tracked, additional features may be identified, such as the individual features of the face, such as the nose and eyes. The more data tracked, the more detailed gestures, or subtler motion, such as pursing one's lips can be tracked. However, the more data changes tracked also may slow the avatar display down.

An exemplary gesture is a "heel lift jump." In this, a user may create the gesture by raising his heels off the ground, but keeping his toes planted. Alternatively, the user may jump into the air where his feet 720 leave the ground entirely. The system may parse the skeleton for this gesture by analyzing the angle relation of the shoulders 710, hips 712 and knees 716 to see if they are in a position of alignment equal to standing up straight. Then these points and upper 726 and lower 728 spine points may be monitored for any upward acceleration. A sufficient combination of acceleration may trigger a jump gesture.

Given this "heel lift jump" gesture, the parameters may include the above acceleration threshold, which determines how fast some combination of the user's shoulders 710, hips 712 and knees 716 must move upward to trigger the gesture, as well as a maximum angle of alignment between the shoulders 710, hips 712 and knees 716 at which a jump may still be triggered. The outputs may comprise a confidence level, as well as the user's body angle at the time of the jump.

An exemplary prohibited action or gesture may be a fist except for the middle finger extended, sometimes referred to as flipping someone off or flipping someone the bird. The motion module 204 can determine a motion change with respect to one or more fingers 701a through 701j. In one example, the image capture system 60 assigns a value in a bitmask of 0 or 1 for each finger corresponding to an open or closed position. A gesture filter for the "flipping the bird" pose traverses the portion of the data 205 linked to the fingers body parts and determines which fingers are open and closed. Responsive to only the middle finger on a hand being extended or "open", the corresponding gesture filter 206 returns a confidence level indicating a probability that is high enough to trigger alteration of the display of the avatar to avoid depicting this gesture.

The motion module 204 links into the prohibited gesture library module 210 associated with the flipping the bird gesture filter. The processing of the prohibited gesture library module 210 may include one or more options for alteration. One option is simply omission or not to display the finger extended. Omitting the finger extension may leave just a fist showing. In other words, the motion of extending the finger may not be represented in the image data 219 for display of the avatar. Another option is to apply a filtering technique to visually obscure the prohibited gesture on the display.

For more detailed information on an image capture system and its processing that can be used with the present technology, reference may be made to the following applications: U.S. patent application Ser. No. 12/474,655, "Gesture Tool" filed on May 29, 2009, and hereby fully incorporated herein by reference; U.S. patent application Ser. No. 12/422,661, "Gesture Recognizer System Architecture," filed on Apr. 13, 2009 and hereby fully incorporated herein by reference; U.S. patent application Ser. No. 12/391,150, "Standard Gestures," filed on Feb. 23, 2009 and hereby fully incorporated herein by reference.

Figure 8A:
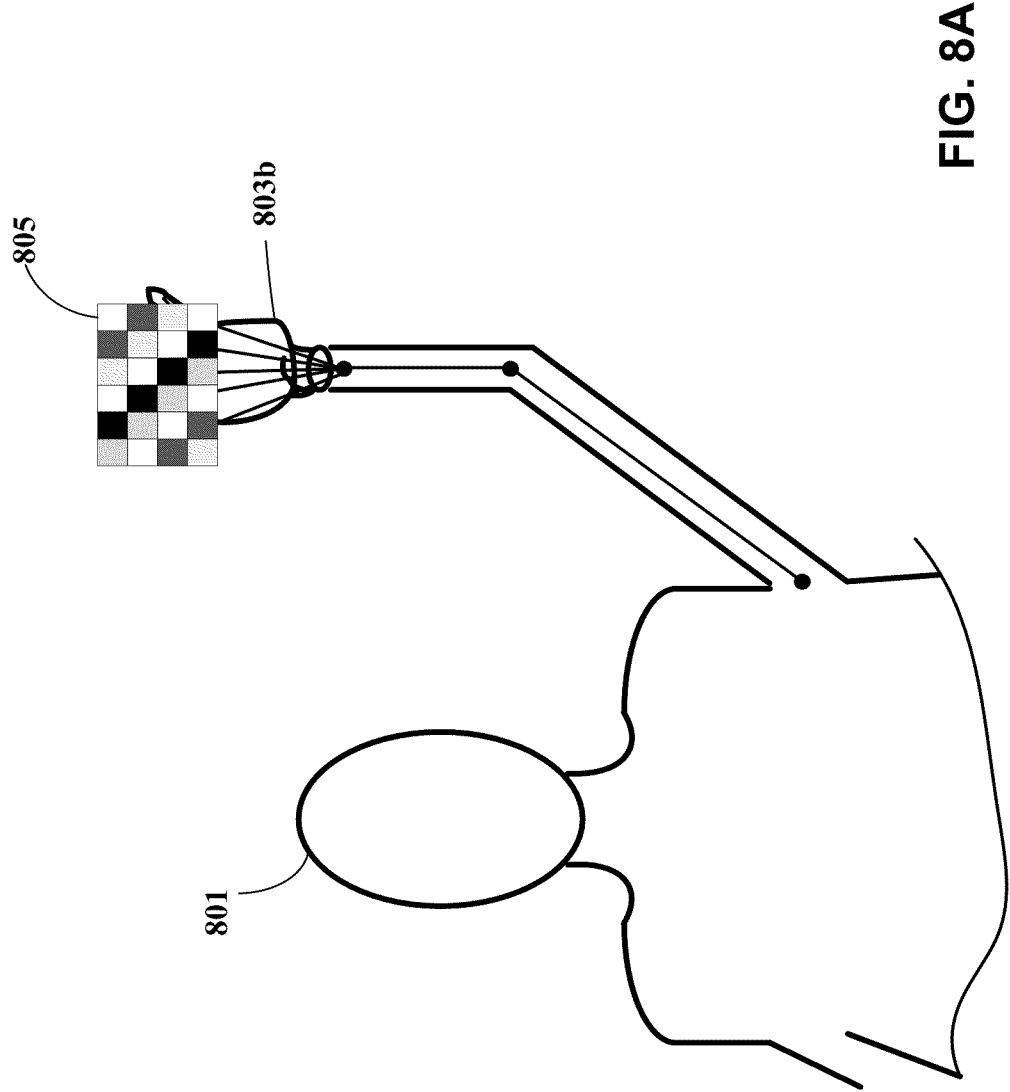
FIG. 8A illustrates an example of a filtering technique to visually obscure a prohibited gesture on a display.

FIG. 8A illustrates an example of a filtering technique to visually obscure a prohibited gesture on an avatar 801 a display. An example of such a technique is pixelation which is shown in FIG. 8A. The left hand 803b of avatar 801 including the extended middle finger is covered with pixels of varying colors or grayscale 805 so the prohibited gesture is concealed in the image.

Another option is to substitute another movement or pose instead. A prohibited gesture module 210 can include substitute image data processing instructions 212, or call a routine with the instructions for the substitute image data processing 212 to which it is linked as programming preferences may dictate.

Figure 8C:
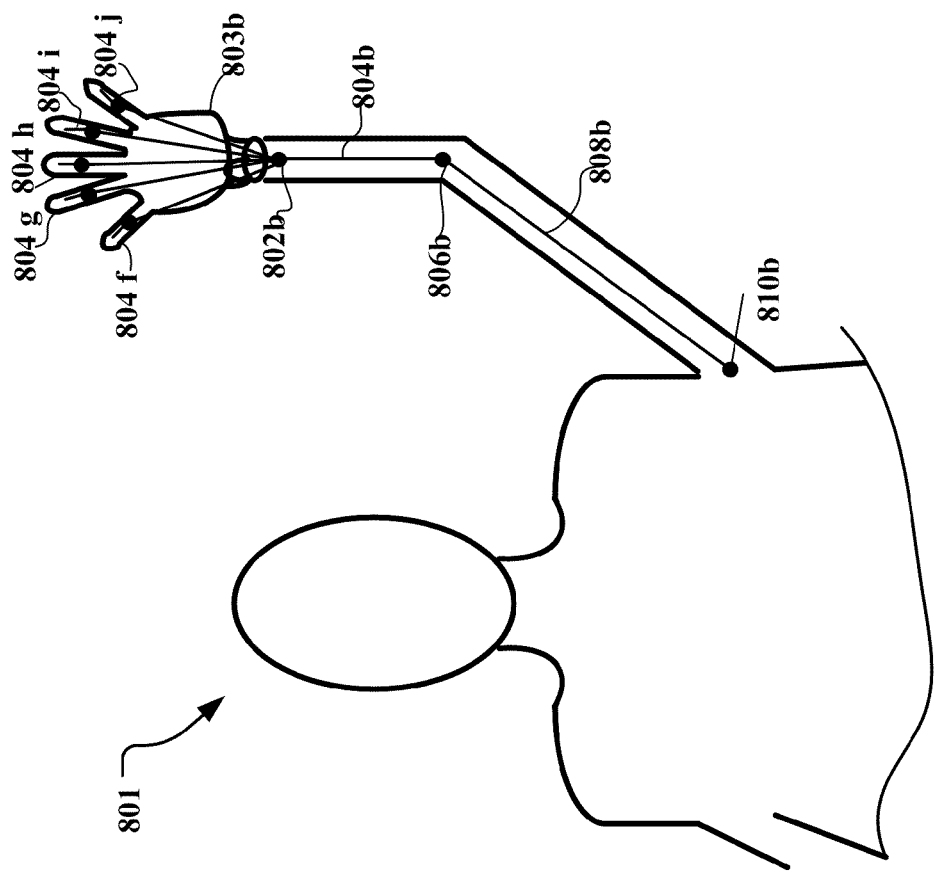
FIG. 8C illustrates an avatar updated to display the substitute image data of the example in FIG. 8B.
Figure 8B:
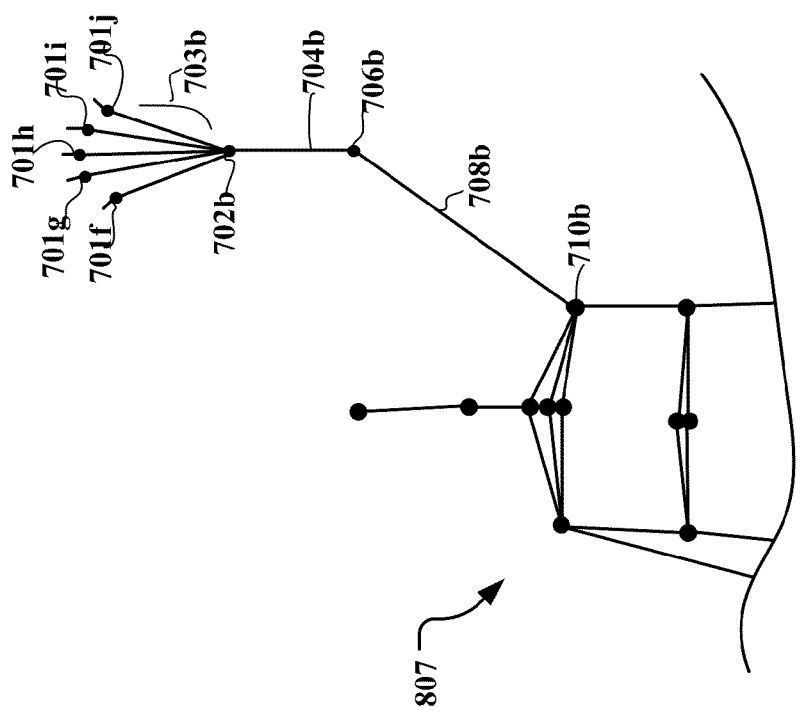
FIG. 8B illustrates an example of substitute image data being applied to an example skeletal model to replace a prohibited gesture.

FIG. 8B illustrates an example of substitute image data being applied to an example skeletal model to replace a prohibited gesture, and FIG. 8C illustrates an avatar updated to display the substitute image data of the example in FIG. 8B. Motion data for the gesture is replaced with different, less offensive, motion data for the avatar. In this example, a wave of the hand is substituted for flipping the bird. A "canned" or stored animation data (e.g. a motion capture file) is used to generate the wave. In one example, finger motion has fairly limited representation to "open" or "closed" for their associated joints and a bit value is used to indicate the position of the finger joints. The data structures for the fingers on the left hand are assigned so that they are all extended. This example is reflected in the skeletal data model top half 807 illustrated in FIG. 8B where skeletal finger joints 701f-701j are open or extended on left hand 703b to make a wave. The corresponding avatar 801 in FIG. 8C waves his left hand 803b fingers consistent with the skeletal finger data updated for his model as represented by "joints" 804f-804j. Additionally, the avatar's wrist joint 802b, forearm 804b, elbow 806b, bicep 808b, and shoulder joint 810b mimic the motion of the corresponding joints 702b, 704b, 706b, 708b and 710b of the user's skeletal model in FIG. 8B.

Figure 9A:
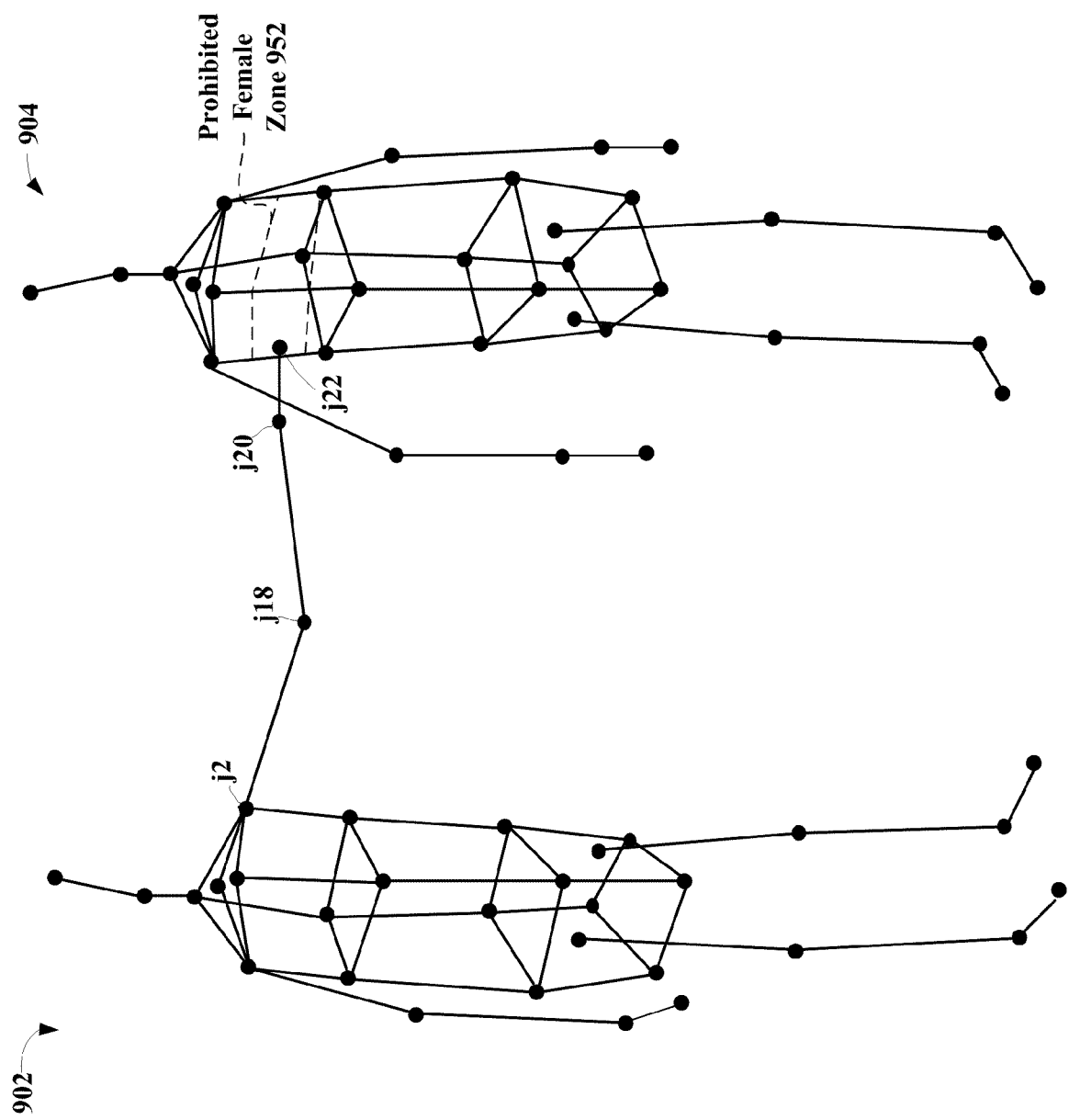
FIG. 9A illustrates an example of a prohibited interaction as illustrated by skeletal model data for two users.

A prohibited gesture or action may not be the pose itself but is an interaction with another object in the capture area. FIG. 9A illustrates an example of a prohibited interaction as illustrated by skeletal model data for two users. In the example shown in FIG. 9A. The user associated with model 904 is represented by a female avatar. Her skeletal data model 904 includes prohibited zone 952 in her breast area. Prohibited zones can be a surface or a volume of space defined with respect to a model. Besides the breast area of a female avatar, another example of such a prohibited zone is the genital region of either a male or female avatar. These prohibited areas are likely regions for lewd gestures to be performed, and they generally lack relevance in many applications using avatars such as games and business applications.

In one example, based on depth data being associated with different users and with a prohibited zone 952 defined for one of the users, if straight-through motion tracking processing were to occur, the skeletal model 902, for example a male user in this case, would represent the inappropriate touching in the prohibited zone 952 of female avatar 904.

FIG. 9B illustrates an example of substituting image data in the form of motion data for the prohibited interaction example of FIG. 9A as illustrated by skeletal model data for the two users. For this example, the motion module 204 can call a gesture filter 206 or do the processing itself to remap another scene object, in this case the offending hand, outside the prohibited zone 952. In an example, representing motion in terms of force vectors (not drawn to scale or angle precision), vector f2 indicates shoulder joint 2 has moved up and a little to the right; vector force f18 illustrates the upward motion and translation to the right of elbow joint j18; vector force f20 illustrates the upward motion and translation to the right of wrist joint j20; and force vector f22 (larger and wider for visibility in the drawing, not magnitude) pushes joint j22, which may be representative of knuckle or finger joints, up and to the right so that the hand associated with skeletal model 902 now rests on the shoulder of user 904. This substitution of data for a different motion (e.g. as can be stored in a motion capture file) can be defined in a substitute library processing module 212 associated with a prohibited gesture module 210 associated with prohibited zone 952. Animation blending and remapping techniques may be used to incorporate substitute motion processing. There may be some delay due to the blending or remapping. Generally, when similar actions are used, the timing for implementing the substitute action is similar to the timing for displaying the original gesture. One example of similarity between actions is using the same body parts. Another example is interacting with an area nearby the prohibited zone. Displaying a fist or hand wave instead of the middle finger gesture is an example of a suitable action using similar body parts. For the wave example, directing all five fingers to be extended takes nearly the same amount of time as only the middle finger being extended. Transferring the touching to one's shoulder as opposed to the breast area is an example of keeping the location within a distance so as not to disturb the timing flow of the action too much.

For more information about animation blending and remapping, see U.S. patent application Ser. No. 12/475,422 entitled SYSTEMS AND METHODS FOR APPLYING ANIMATIONS OR MOTIONS TO A CHARACTER, Filed May 29, 2009, inventors, Jeffrey Margolis, Kathryn Stone Perez and Alex Kipman, and U.S. patent application Ser. No. 12/475,295 entitled EXTENDING STANDARD GESTURES Filed May, 29, 2009, inventors Kathryn Stone Perez.

In other embodiments, all the players are not locally captured by the same capture system. Remote players may perform lewd acts within the animated scene context. For example, a user may reach his arm to touch another player's avatar in the scene in a prohibited zone. In dealing with the interaction of avatars in remote locations, the data received can be in different forms.

For example, in a cloud computing environment (e.g. 370) where a local image capture system, either by itself or via additional processing capabilities such as a game console (e.g. 52), transfers the motion tracking data over the Internet to one or more servers as in FIG. 4, the data can be the motion tracking data of the user with the depth data to assist with their faster processing capabilities with the model update and avatar update. Or the data may be model data for the user already updated with the latest captured actions.

In another example, the model data for the user is the same model data for the avatar. For example, the avatar is a realistic representation of the user's physique. In other examples, the user's model data may be remapped to a model for the avatar. As mentioned previously, the user 18 in FIGS. 1A and 1B is a boy or teenager who does not have the same height and build as his avatar boxer 64. The motion tracking data received may be with respect to the model data for the avatar. Motion tracking data for avatars can also be received from a system wherein a user controls an avatar not with his body movements but with devices like a keyboard, a mouse, a trackball, a joystick, a gamepad or others. The motion tracking data can include the model for the avatar or include updates in reference to the model data for an avatar. The model data for an avatar can be structured in a machine representable form just like model data for a user. For example, its body parts may be in data structures of joints and bones representing the current vectors or rotations acting on them. Additionally, the different avatar data structures can include player indexes to distinguish one from another and from scene data.

Returning to FIG. 2 for illustrative purposes only, the motion module 204, in one embodiment of receiving model data for the avatar, processes the model data to determine based on motion tracking data if a prohibited gesture is being performed by the avatar. In particular, the motion module 204, which has access to scene data 218, can traverse the avatar model's data structure to determine its prohibited zones and how its body parts are currently or previously positioned. This may have been captured in a motion capture file. The motion module 204 applies the gesture filters 206 to detect if a prohibited gesture is being made. If so, the prohibited gesture library module 210 is called to process the avatar's model to alter image data representing the gesture, whether by filtration, omission, or substitution.

The motion module 204 can also determine interactions with other avatars or scene objects. In the example of FIGS. 9A and 9B, the motion module 204 can track user 902's motion with respect to the scene as well as in the capture area, and recognize that his reach would be on a prohibited zone 952 indicated in model data for the avatar of user 904 who in this example is playing at a location remote from user 902.

In another example of a combat game, when a user's avatar has been killed, and the user is out of the game, the onscreen avatar may be lying on the ground. The avatar on the ground can be detected by the motion module 204 due to its processing of avatar and scene data 218. For example, there may be a bounding box around the dead avatar in scene data 218 and a player index associated with it distinguishing it from the surviving avatars and background. To avoid displaying an offensive gesture of another avatar of a user still in the game relative to another inactive avatar, the substitute library module may be used. For example, one gesture may be the active player standing astride the dead avatar and bending and unbending his knees, touching the avatar in an offensive manner or otherwise simulating movements considered offensive. In such cases, a substitute library module 212 can execute to bring the leg opposite the previous direction of motion to the same side of the body as the other leg in a standing upright pose.

Further processing of substitute image data can ensue if desired. For example, if a knee bend is detected with no foot movement while the surviving avatar is within a distance of the dead body, the avatar can be left standing. The lack of movement may encourage the offending player to return to the action of the game rather than lewd conduct.

Figure 10:
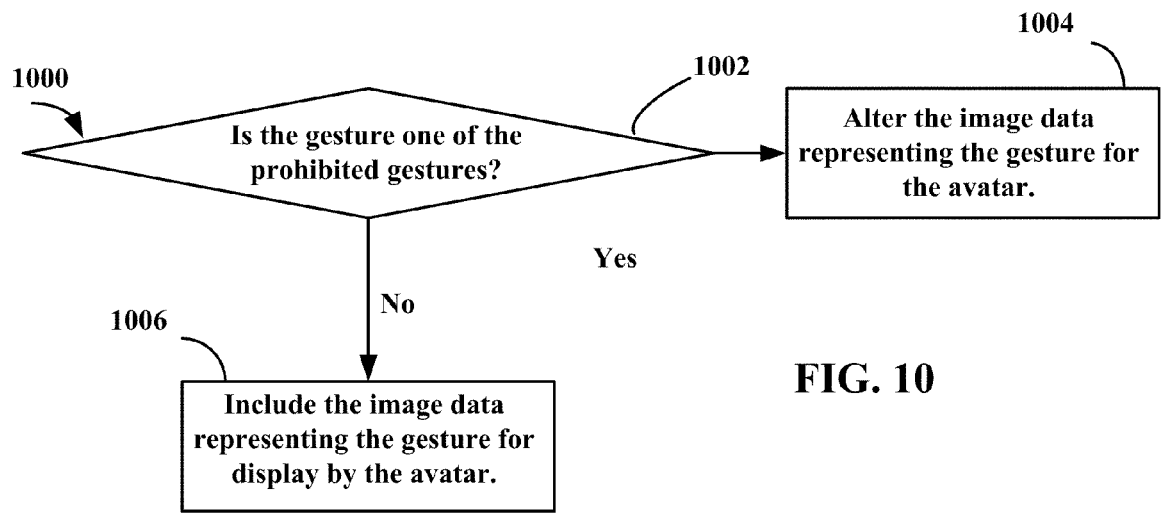
FIG. 10 is a flowchart of an embodiment of a method for limiting gesture display of an avatar.
Figure 11:
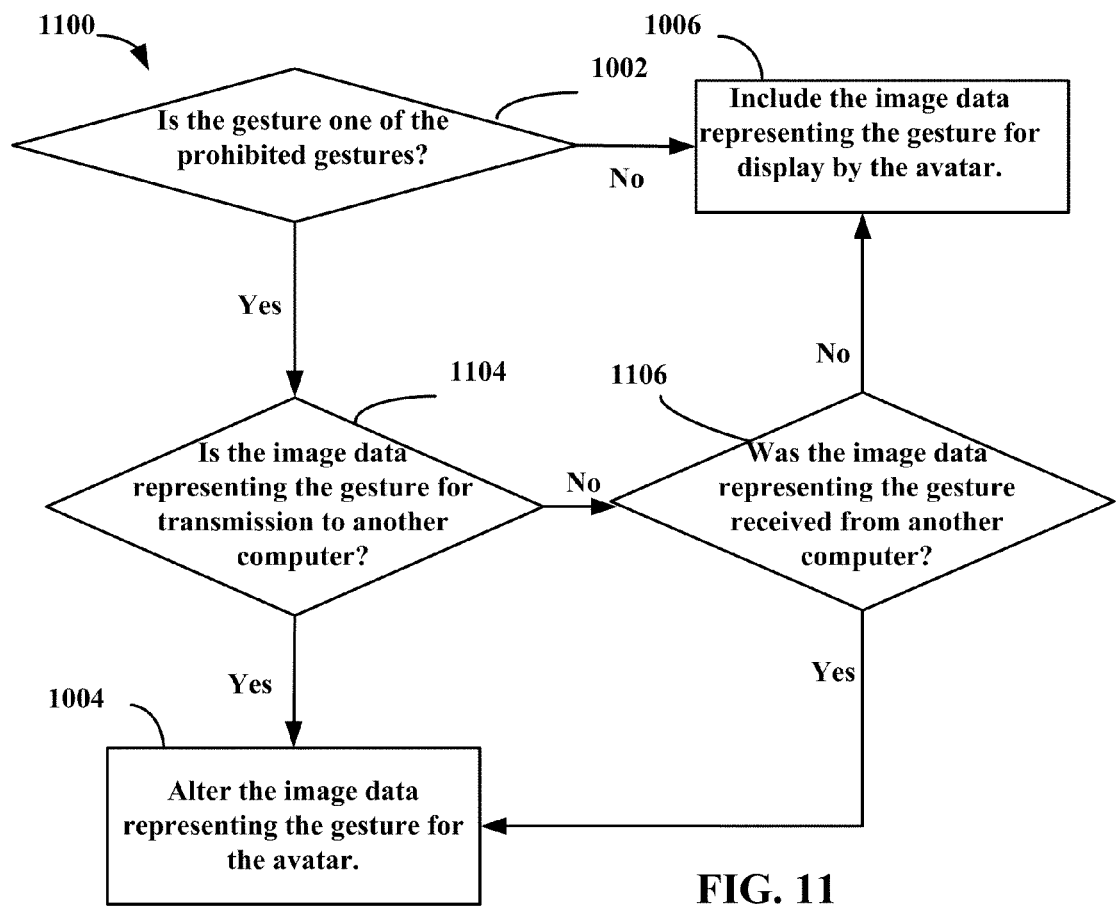
FIG. 11 is a flowchart of another embodiment of a method for limiting gesture display of an avatar.
Figure 12:
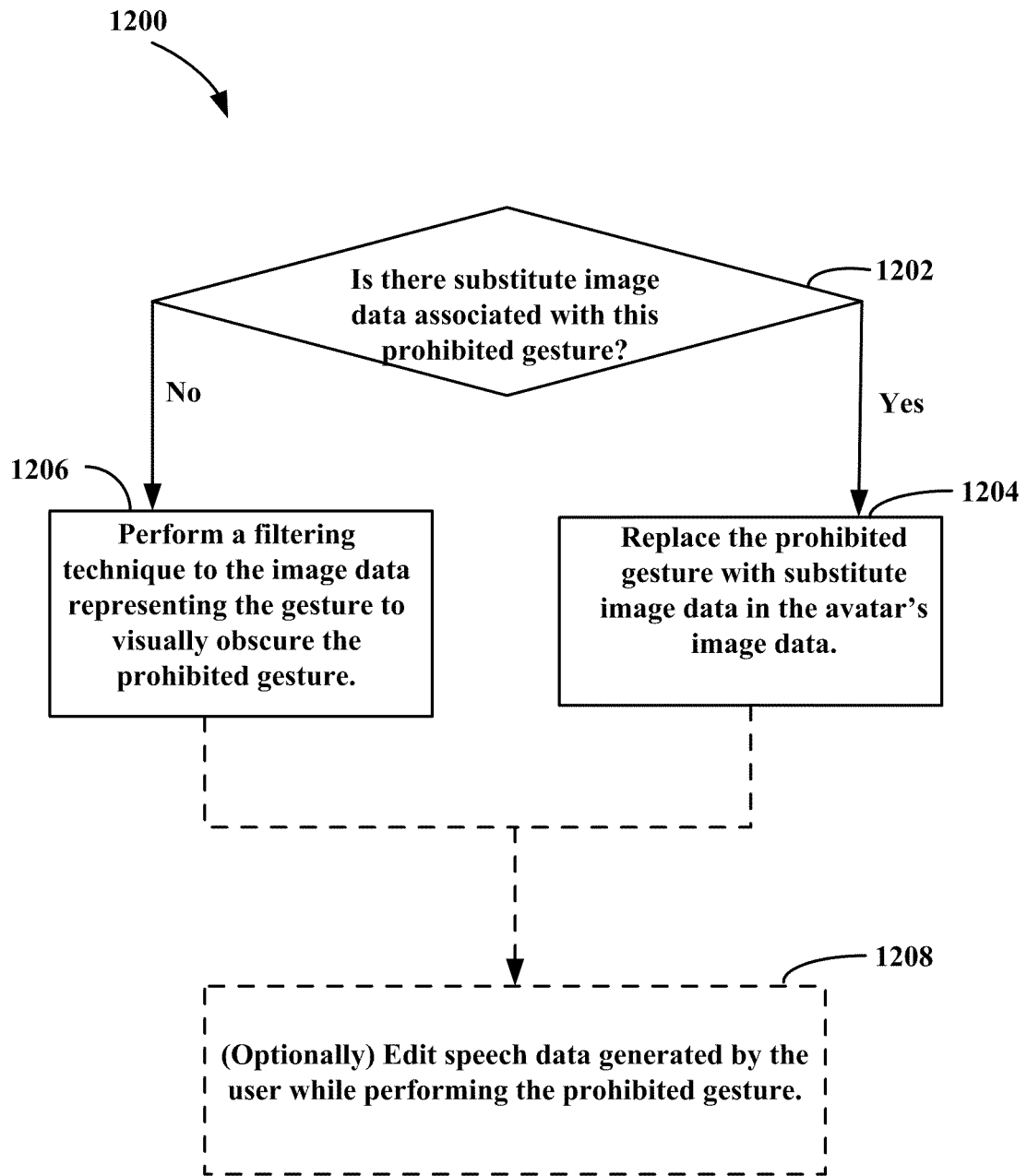
FIG. 12 illustrates a method for altering image data representing the gesture for the avatar.

The method embodiments of FIGS. 10, 11, and 12 respectively are discussed in the context of the functional computer-implemented architecture embodiment of FIG. 2 for illustrative purposes only and not to be limiting thereof.

FIG. 10 is a flowchart of an embodiment of a method 1000 for limiting gesture display of an avatar. The motion module 204 determines 1002 whether a gesture of the avatar depicts one of a set of prohibited gestures. For example, the motion module can make this determination based on motion tracking data. Responsive to the gesture being of the set of prohibited gestures, the motion module 204 alters 1004 image data representing the gesture for the avatar. If the gesture is not one of the prohibited set of gestures, the motion module 204 includes the image data representing the gesture for display by the avatar. An example of image data representing the gesture for the avatar is motion tracking data with respect to a model which is used to control updating the display of the avatar.

FIG. 11 is a flowchart of another embodiment of a method 1100 for limiting gesture display of an avatar. The motion module 204 determines 1002 whether a gesture of the avatar depicts one of a set of prohibited gestures. If the gesture is not one of the prohibited set of gestures, the motion module 204 includes 1006 the image data representing the gesture for display by the avatar. For example, the motion module updates the image data of the avatar profile 214.

Responsive to the gesture being of the set of prohibited gestures, the motion module 204 determines 1104 whether the image data representing the prohibited gesture of the avatar is being transmitted to another computer or over a network. If it is to be transmitted, the motion module 204 alters 1004 the image data representing the gesture of the avatar in the data for transmission. The avatar control system 202 can notify the user that the transmitted version was altered while still displaying the gesture on a display directly or locally connected to the user's computer (e.g. display 56 in FIGS. 1A and 1B). For example, a smaller window can be displayed on the window (e.g. picture in picture display), and that smaller window can display the transmitted version of the gesture for the avatar.

In the embodiment of FIG. 2, the avatar profile 214 can store different versions of the image data, a local version 219*l* including the prohibited gesture, and a transmission version 219*i* which includes alteration of the image data for the prohibited gesture to avoid its depiction on a display.

A situation can arise where the user stores to non-volatile memory, or records, the session of the application which includes the prohibited gesture, for example, the local copy that was not transmitted. Later, he decides to upload it to a sharing site so others can access it. In one embodiment, the motion module 204 stores motion tracking data for the model of either the user or the avatar, or both, for the whole session. For example, it archives the changes in the model data in the time order so the changes as may be represented in vectors and rotations is preserved and can be regenerated. Responsive to a message or indication that the session is to be saved, the motion tracking data for the whole session is saved as well as the video file.

Responsive to a message or indication that the video file is to be transmitted from the operating system 318, the motion module 204 of the avatar control system 202 re-generates or processes the motion tracking data for the session checking for prohibited gestures. If a prohibited gesture is detected, alteration of the image data representing the gesture for the avatar takes place.

Alternatively, or in addition thereto, the motion module 204 of a receiving system processes the motion tracking data archived for the session checking for any prohibited gestures.

In another embodiment, if only the video file is saved, with no motion tracking data, the video file can be treated as raw image data, and a model generated for each of the avatars to determine if any of them is performing a prohibited gesture.

The motion module 204 can track the source of the image data 205 as being from the audiovisual data capture system 60 (205*l*) or as being received from another computer over a network (205*i*) such as the Internet 203. If the image gesture data is not for transmission, the motion module 204 determines whether 1106 the image data representing the prohibited gesture was received from another computer or generated locally. If not received from another computer and not for transmission, in this embodiment, the motion module 204 includes 1006 the image data representing the gesture for display by the avatar. For example, it updates the avatar profile 214 for display of the gesture when the profile is accessed by the avatar display control module 209. If the prohibited gesture was received from another computer, the motion module 204 alters 1004 image data representing the gesture for the avatar so that the prohibited gesture will not be displayed in its original form. Generally, the alteration makes the displayed gesture less offensive than the prohibited gesture.

FIG. 12 illustrates a method 1200 for altering image data representing the gesture for the avatar. Using FIG. 2's system as an illustrative context only again, the motion module 204 determines 1202 whether substitute image data is associated with this prohibited gesture. For example, the motion module 204 may search a database or traverse linked lists of the prohibited gesture library 210 and its associated substitute library 212. Responsive to there being an associated substitute, the motion module 204 replaces 1204 the prohibited gesture with substitute image data in the avatar's image data. For example, it modifies the motion tracking data in image data 219 for the body part(s). For example the motion module 204 replaces motion data, which includes motion tracking data, in the image data for the gesture with different motion data for the avatar. As discussed above, an example of a prohibited gesture detected may be a fist except for the middle finger extended. Linked substitute image or motion data may be a regular fist as typically depicted with no extended figures or a hand wave as disclosed in FIGS. 8B and 8C.

Responsive to there not being associated substitute image data, the motion module 204 performs 1206 a filtering technique to the image data representing the gesture in order to visually obscure the prohibited gesture. For example, see the pixelation overlay 805 in FIG. 8A.

Optionally, the motion module 204 can edit 1208 speech data generated by the user while performing the prohibited gesture. Examples of such editing include cutting the audio entirely or using speech recognition to delete expletives.

The technology may be embodied in other specific forms without departing from the spirit or essential characteristics thereof. Likewise, the particular naming and division of modules, routines, features, attributes, methodologies and other aspects are not mandatory, and the mechanisms that implement the present technology or its features may have different names, divisions and/or formats. Furthermore, as will be apparent to one of ordinary skill in the relevant art, the modules, routines, features, attributes, methodologies and other aspects of the embodiments disclosed can be implemented as software, hardware, firmware or any combination of the three. Of course, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of programming.

The foregoing detailed description has been presented for purposes of illustration and description. It is not intended to be exhaustive or to limit the technology disclosed to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. Moreover, it should be noted that the language used in the specification has been principally selected for readability and instructional purposes. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. In a computer system wherein images of avatars are rendered based on skeletal model data, a method for limiting presentation of certain gestures by one or more rendered avatars, the method comprising:
    tracking motions of at least one local user by using a local capture device generating motion tracking data at a local system and using the motion tracking data for updating a skeletal model of the local user, where the skeletal model can be used to produce a corresponding local avatar and one or more remote avatars;
    determining if updating of the skeletal model enables one or more remote avatars to present an avatar gesture that is one of a predetermined set of prohibited gestures;
    in response to said determining, determining whether update data that includes a portion which enables a remote avatar to present the prohibited avatar gesture is to be transmitted to at least one remote system to thereby enable generation by the remote system of a remote avatar presenting the prohibited avatar gesture;
    responsive to the determining whether the update data is to be transmitted, determining to alter the portion, thus preventing the prohibited avatar gesture in the remote system.

2. The method of claim 1 further wherein the corresponding local avatar is produced and wherein said tracking of the motions of the local user is performed in real-time so as to enable real-time display of the updated local avatar.

3. The method of claim 1 wherein the determining of whether to alter the portion that represents the prohibited avatar gesture is followed by an altering of the update data portion representing the prohibited avatar gesture and the altering comprises performing a filtering technique to motion tracking data that leads to presentation of the gesture to thereby visually obscure the prohibited gesture.

4. The method of claim 3 wherein the performing of the filtering technique to the motion tracking data includes altering the motion tracking data to cause a rendering of pixilation in a remote display of a motion corresponding to the prohibited gesture.

5. The method of claim 1 wherein the determining of whether to alter the portion that represents the prohibited avatar gesture is followed by an altering of updating data representing the gesture and the altering of the updating data comprises substituting-in substitute motion data for the motion tracking data representing the prohibited gesture.

6. The method of claim 5 wherein the substituting-in of the substitute motion data for the motion tracking data representing the prohibited gesture further comprises causing a moving of a scene object or of a body part to avoid displaying interaction with a prohibited zone associated with a model of the avatar.

7. The method of claim 1 wherein determining whether the updating of the user skeletal model might enable remote presentation of a remote avatar that depicts one of a set of prohibited gestures further comprises:
    tracking respective motions of at least two users at the local system;
    responsive to the tracking, updating respective skeletal models of corresponding local avatars of the at least two users;
    determining whether the updated and respective skeletal models represent a disposition of one of the updated and respective avatar skeletal models relative to another which constitutes a predetermined inappropriate disposition user between the updated and respective avatar skeletal models.

8. A computer-implemented system for limiting modeled gestures of one or more potentially displayable avatars, the system comprising:
    a local depth image capture system configured to capture image data representative of live motions of a local user,
    one or more data processors operatively coupled to the local depth image capture system and configured to generate a skeletal model of the local user based on the captured image data;
    one or more memory devices accessible by the one or more data processors and configured to store motion tracking data corresponding to the motions of the local user as captured by the image capture system;
    the one or more data processors being further configured to generate updating data for updating the skeletal model of the local user based on the stored motion tracking data;
    the one or more data processors being configured to render an updated local avatar on a local display based on the updating data for the local skeletal model;
    the one or more data processors being configured to determine, based on the updating data for the local skeletal model, whether the updated local avatar will have a gesture included in a predetermined set of prohibited gestures, said determining of whether a prohibited gesture will be had being based on parameter data defining criteria for motions representative of a set of prohibited gestures;
    the one or more data processors being configured to determine whether updating data corresponding to that for the local skeletal model is to be transmitted to a remote system to allow a rendering thereby of a correspondingly updated remote avatar that is potentially displayable on a remote display coupled to the remote system; and
    the one or more data processors being further configured to respond to the determination that the gesture is a prohibited gesture and to the determination that updating data corresponding to that prohibited gesture of the local skeletal model is to be transmitted, where the one or more data processors produce altered skeletal model updating data that obscures the prohibited gesture, and transmit said altered skeletal model updating data to the remote system in place of the updating data corresponding to the prohibited gesture.

9. The system of claim 8 wherein the one or more data processors are further configured to substitute into the to-be-transmitted updating data, substitute motion data that represents a different motion than that of the updating data which corresponds to the prohibited gesture.

10. The system of claim 8 wherein the one or more data processors are further configured to allow displaying of the prohibited gesture on the local display.

11. The system of claim 8 wherein the one or more data processors are further configured to obscure imagery of the prohibited gesture by causing performance in the remote system of a filtering technique to the imagery of the prohibited gesture to thus visually obscure the prohibited gesture on the remote display.

12. The system of claim 8 wherein the image capture system comprises a microphone for capturing audio data of the user and the one or more data processors are further configured to automatically edit speech data representing sounds generated by the user while performing the prohibited gesture.

13. A computer storage device comprising instructions encoded thereon for causing one or more processors that are operatively coupled to the storage device to execute a method for limiting gesture display by an avatar, the instructions comprising:
- instructions to track respectively local motions of at least a first user and a second user using one or more respectively located depth image capture devices for the users and thereby generating respective user motion tracking data at a respective one or more local systems that are remote to one another, the motion tracking data allowing the generation of a first skeletal model for controlling a first avatar and of a second skeletal model for controlling a second avatar;
- instructions to determine whether the motion tracking data for the first skeletal model relative to that for the second skeletal model would result in performance by the first avatar of one of a set of prohibited gestures;
- instructions to determine whether the representation of the first avatar is to be converted to image data for transmission to a second processing device; and
- instructions to determine if the image data is to be transmitted to a second processing device, and if the determined avatar gesture is in the set of prohibited gestures, the instructions cause a replacing of motion data for generating the prohibited gesture with different motion data for rendering an alternate remote avatar and not transmitting the image data to the second processing device and instead transmitting the different motion data to the second processing device to allow rendering of the alternate remote avatar in place of the first avatar on the remote display, the alternate remote avatar not exhibiting the prohibited gesture while using the first skeletal model to render a local avatar on the display coupled to the local system.

14. The computer storage device of claim 13 wherein the different motion data for the avatar is stored in a motion capture file.

15. The computer storage device of claim 13 wherein said tracking is performed by tracking in real-time motions of a user as determined from mapping image data of the user to define motions of a skeletal model and then converting the skeletal model into image data for displaying motions by a corresponding avatar.

16. The computer storage device of claim 13 wherein the image data for transmission to a second processing device comprises a stored video file, and further comprising regenerating motion tracking data for the remote avatar in the stored video file responsive to an indication that the video file is being transmitted.

17. The computer storage device of claim 13 wherein the instructions further comprise instructions to track in real-time motions of an avatar for data being received over a network in real-time.

18. The computer storage device of claim 13 wherein the instructions further include instructions to display the prohibited gesture on the local display.

19. The computer storage device of claim 13 wherein replacing motion data for the gesture with different motion data for the avatar further comprises replacing motion for one or more body parts used in the gesture with motion for the same one or more body parts.

* * * * *